US012691567B2

(12) United States Patent
Kielsmeier et al.

(10) Patent No.: US 12,691,567 B2
(45) Date of Patent: Jul. 28, 2026

(54) KNIFE WITH REMOVABLE HANDLE SCALES

(71) Applicant: Magpul Industries Corp., Austin, TX (US)

(72) Inventors: Nicholas Kielsmeier, Denver, CO (US); Clinton Wade Lynch, Erie, CO (US)

(73) Assignee: Magpul Industries Corp., Austin, TX (US)

( * ) Notice: Subject to any disclaimer, the term of this patent is extended or adjusted under 35 U.S.C. 154(b) by 343 days.

(21) Appl. No.: 18/489,494

(22) Filed: Oct. 18, 2023

(65) Prior Publication Data

US 2024/0131678 A1 Apr. 25, 2024
US 2024/0227151 A9 Jul. 11, 2024

Related U.S. Application Data

(60) Provisional application No. 63/419,288, filed on Oct. 25, 2022.

(51) Int. Cl.

| | |
|---|---|
| ***B25G 3/12*** | (2006.01) |
| ***B26B 3/00*** | (2006.01) |
| ***B26B 29/02*** | (2006.01) |

(52) U.S. Cl.
CPC .................. *B25G 3/12* (2013.01); *B26B 3/00* (2013.01); *B26B 29/025* (2013.01)

(58) Field of Classification Search
None
See application file for complete search history.

(56) References Cited

U.S. PATENT DOCUMENTS

| | | |
|---|---|---|
| 3,524,570 A | 8/1970 | Seguine |
| 5,092,046 A | 3/1992 | Collins |
| 5,379,520 A | 1/1995 | Collins |
| 5,915,793 A | 6/1999 | Serpa |
| 5,926,959 A | 7/1999 | Collins |

(Continued)

FOREIGN PATENT DOCUMENTS

| | | |
|---|---|---|
| CN | 106003170 B | 4/2018 |
| WO | 2010/047836 A1 | 4/2010 |

OTHER PUBLICATIONS

"Exo-Mod Drop Point—Orange", Gerber, 3 pages, online available at <https://www.gerbergear.com/en-us/shop/knives/fixed/exo-mod-drop-point-orange-30-001796>, known as early as Apr. 29, 2022.

*Primary Examiner* — Hwei-Siu C Payer
(74) *Attorney, Agent, or Firm* — NOD Law PC

(57) ABSTRACT

This disclosure describes a knife having tool-less removable scales. The knife includes a blade having a cutting edge and a tang having one or more apertures formed therein; a first scale removably coupled to a second scale, the first and second scales releasably coupled to each other through the one or more apertures and positioned on either side of the tang, the first scale comprising a scale release actuator that is biased at least partially through an opening in the second scale such that the second and first scales are locked together until the scale release actuator is depressed. The disclosure also describes a knife sheath with a rotatable clip that can be rotated by releasing two halves of a compression bracket, moving a first half of the compression bracket away from the sheath, and rotating the clip once a toothed engagement is disengaged.

21 Claims, 21 Drawing Sheets

(56) References Cited

U.S. PATENT DOCUMENTS

| | | | |
|---|---|---|---|
| 6,138,363 A | 10/2000 | Kawashima | |
| 6,293,448 B1 | 9/2001 | Pietrusynski | |
| 6,457,240 B1 | 10/2002 | Liu | |
| 6,619,487 B2 | 9/2003 | Stuchlik, III | |
| 7,434,316 B2 | 10/2008 | Nenadic | |
| 7,930,830 B2 * | 4/2011 | Gringer | B23D 79/10<br>30/294 |
| 9,033,148 B2 | 5/2015 | Adams | |
| 9,254,577 B2 | 2/2016 | Kommer | |
| 9,986,795 B2 | 6/2018 | Bloch | |
| 9,999,279 B2 | 6/2018 | Bloch | |
| 10,081,112 B2 | 9/2018 | Langenwalter et al. | |
| 10,363,675 B2 | 7/2019 | Robinson et al. | |
| 10,377,031 B2 | 8/2019 | Wood | |
| 10,456,938 B2 | 10/2019 | Wu | |
| 10,512,315 B2 | 12/2019 | Bloch | |
| 10,631,599 B2 | 4/2020 | Bloch | |
| 12,251,849 B1 * | 3/2025 | Marfione | B26B 3/00 |
| 2008/0250652 A1 | 10/2008 | Fellhoelter | |
| 2012/0102759 A1 | 5/2012 | Huang | |
| 2017/0043493 A1 | 2/2017 | Seber et al. | |
| 2018/0207827 A1 | 7/2018 | Hsieh | |
| 2019/0009420 A1 | 1/2019 | Robinson et al. | |
| 2020/0384662 A1 | 12/2020 | Hunt et al. | |
| 2024/0131678 A1 * | 4/2024 | Kielsmeier | B25G 3/12 |
| 2024/0227151 A9 * | 7/2024 | Kielsmeier | B26B 29/025 |

* cited by examiner

KNIFE WITH REMOVABLE HANDLE SCALES

CROSS-REFERENCE TO RELATED APPLICATIONS

The present application claims priority to U.S. Provisional Application No. 63/419,288, entitled "Knife with Removable Handle Scales", filed Oct. 25, 2022, assigned to the assignee hereof and the contents of which are incorporated herein by reference in their entirety and for all proper purposes.

FIELD OF THE DISCLOSURE

The present disclosure relates generally to fixed blade knives. In particular, but not by way of limitation, the present disclosure relates to systems, methods and apparatuses for installing and removing handle scales on a fixed blade knife.

DESCRIPTION OF RELATED ART

Fixed blade knives are common in the hunting and industrial spaces and many feature a tang that forms the main handle with removable handle scales that are attached with pins, rivets or screws. To run a minimalist or compact configuration it is often advantageous to remove the handle scales to reduce the volume or bulk of the package. However, this process typically involves tool-based removal of the handle scales. There is therefore a need in the art for handle scales featuring tool-less removal.

U.S. Pat. No. 10,081,112 describes removable handle scales that are magnetically coupled to an inner portion of a handle. However, to allow removal, magnets typically cannot be very strong, which creates the potential that inadvertent contact could dislodge or decouple the handle scales. Therefore, magnetic removal techniques may not be optimal for certain potentially high-impact applications.

U.S. Patent Application No. 2020/0384662 discusses a knife sheath having a detent formed on or otherwise coupled to a cantilevered arm that can help secure the knife in the sheath.

The description provided in the description of related art section should not be assumed to be prior art merely because it is mentioned in or associated with this section. The description of related art section may include information that describes one or more aspects of the subject technology.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Fixed knives are often paired with a sheath that uses a form of snaps, loops, and friction fits to hold the knife in the sheath and protect the blade (and users from the blade).

However, where removable handle scales are implemented, a knife may not be secure in the sheath when the handle scales are removed. Therefore, there is a need in the art for a sheath that can securely hold a fixed knife with or without handle scales installed.

Broadly, aspects of the present disclosure are directed to fixed blade knives. In particular, but not by way of limitation, the present disclosure relates to systems, methods and apparatuses for installing and removing handle scales on a fixed blade knife.

In some aspects, the techniques described herein relate to a knife having removable handle scales, the knife including: a blade having a cutting edge and a tang, the tang having one or more apertures formed therein; a first handle scale removably coupled to a second handle scale, wherein the first and second handle scales are arranged on opposing sides of the tang and releasably coupled to each other through the one or more apertures in the tang, wherein the first handle scale includes a scale release actuator that is biased at least partially through an opening in the second handle scale such that the first and the second handle scales are locked together until the scale release actuator is depressed.

In some aspects, the techniques described herein relate to a knife sheath including: a sheath body with one or more engagement features configured to releasably hold a knife at least partially within the sheath body; a compression bracket having an aperture; and a rotatable clip passing through the aperture and having a portion that is compressed against the sheath body by the compression bracket thereby locking the rotatable clip into a desired orientation relative to the sheath body.

In some aspects, the techniques described herein relate to a method for forming a knife assembly including: forming a blade having a cutting edge and a tang, the tang having one or more apertures formed therein; arranging a first handle scale on a first side of the tang, wherein the first handle scale includes a scale release actuator; arranging a second handle scale on a second, opposing side of the tang, wherein the second handle scale includes an opening that is shaped and sized to receive at least a portion of the scale release actuator; and releasably coupling the first handle scale to the second handle scale using the one or more apertures in the tang, wherein the releasable coupling further includes biasing the scale release actuator at least partially through the opening in the second handle scale such that the first and the second handle scales are locked together until the scale release actuator is depressed.

In some aspects, the techniques described herein relate to a knife (e.g., a fixed blade knife), wherein the one or more apertures are rectangular in shape.

In some aspects, the techniques described herein relate to a knife, wherein a shape and dimensions of at least one of the one or more apertures coincides with the M-LOK standard.

In some aspects, the techniques described herein relate to a knife, wherein the one or more apertures comprise three apertures.

In some aspects, the techniques described herein relate to a knife, wherein the first handle scale comprises a first hook that is shaped and sized to partially pass through at least a first of the one or more apertures in the tang, and wherein the second handle scale comprises a second hook that is shaped and sized to partially pass through at least the first of the one or more apertures in the tang, and wherein the first and second hooks are configured to engage with each other and hold the first and second handle scales together until the scale release actuator is depressed.

In some aspects, the techniques described herein relate to a knife, wherein: the second handle scale further comprises a third hook that is shaped and sized to partially pass through at least a second of the one or more apertures in the tang, the second scale comprises a fourth hook that is shaped and sized to partially pass through at least the second of the one or more apertures in the tang, the third and fourth hooks are configured to engage with each other and hold the third and fourth handle scales together until the scale release actuator is depressed, the first and third hooks are oriented toward a first end of the knife, and the second and fourth hooks are oriented toward a second, opposing end of the knife.

In some aspects, the techniques described herein relate to a knife, wherein, when in a depressed position, the scale release actuator is configured to allow the second handle scale to be removed from the tang, and wherein removal of the second handle scale enables the first handle scale to be removed in a direction perpendicular to a face of the tang.

In some aspects, the techniques described herein relate to a knife, wherein the first handle scale further comprises a tower that is shaped and sized to partially pass through one of the one or more apertures in the tang, and wherein the tower is positioned against an end of the one of the one or more apertures to allow at least one of: removal of the first handle scale in a direction perpendicular to the face of tang, based at least in part on the removal of the second handle scale from the tang; and prevent the first handle scale from sliding rearward in a direction parallel to a longitudinal axis through the knife.

In some aspects, the techniques described herein relate to a knife, wherein the scale release actuator comprises a user interface member positioned atop a spring.

In some aspects, the techniques described herein relate to a knife, wherein the spring comprises a flexible arm, wherein the flexible arm is arranged at an angle between the user interface member and the first handle scale, and wherein the flexible arm biases the user interface member such that at least a portion of the user interface member extends into the opening in the second handle scale.

In some aspects, the techniques described herein relate to a knife, wherein at least a portion of the blade is configured to be received within a knife sheath, the knife sheath comprising: a sheath body; and one or more engagement features configured to interface with the blade to releasably hold at least the portion of the blade within the sheath body.

In some aspects, the techniques described herein relate to a knife, wherein the blade comprises one or more cutouts, wherein each of the one or more cutouts is positioned along one of an upper spine or a lower spine of the blade, and wherein the one or more engagement features comprise one or more releasable locks, each of the one or more releasable locks configured to engage with one of the one or more cutouts of the blade to releasably hold at least the portion of the blade within the sheath body.

In some aspects, the techniques described herein relate to a knife, wherein the one or more engagement features comprise a plurality of engagement features selected from a group consisting of (1) a first engagement feature configured to engage with a first cutout positioned along an upper spine of the blade, the first engagement feature comprising a first releasable lock; (2) a second engagement feature configured to engage with a second cutout positioned along a lower spine of the blade, the second engagement feature comprising a second releasable lock; (3) a third engagement feature comprising one or more detents positioned on one or more inside faces of the sheath body and configured to press against sides of the blade; and (4) a fourth engagement feature comprising a plurality of circular protrusions, each of the plurality of circular protrusions configured to interface with a dimple positioned on a side of the blade.

In some aspects, the techniques described herein relate to a knife, wherein the blade comprises a first dimple positioned on a first side of the blade and a second dimple positioned on a second, opposing side of the blade.

In some aspects, the techniques described herein relate to a knife sheath, wherein the compression bracket comprises a first half and a second half, and wherein, pulling the first and the second halves together enables the locking of the rotatable clip into the desired orientation relative to the sheath body.

In some aspects, the techniques described herein relate to a knife sheath, wherein: the rotatable clip comprise a first set of teeth; the compression bracket comprising a second set of teeth; and the first set of teeth are configured to interface with the second set of teeth to lock the rotatable clip into the desired orientation relative to the sheath body.

In some aspects, the techniques described herein relate to a knife sheath, wherein the second set of teeth of the compression bracket are arranged around a circumference of the aperture in the compression bracket.

In some aspects, the techniques described herein relate to a knife sheath, wherein the rotatable clip comprises at least one elongated opening configured for engagement with a sling.

In some aspects, the techniques described herein relate to a knife having removable handle scales, the knife including: a blade having a cutting edge and a tang, the tang having one or more apertures formed therein; a first handle scale removably coupled to a second handle scale, the first and second handle scales releasably coupled to each other through the one or more apertures in the tang and sandwiching the tang (i.e., positioned on opposing sides of the tang), wherein the first handle scale includes a scale release actuator that is biased at least partially through an opening in the second handle scale such that the first and second handle scales are configured to be locked together until the scale release actuator is depressed.

In some aspects, the techniques described herein relate to a knife (e.g., a fixed blade knife), wherein the one or more apertures are rectangular.

In some aspects, the techniques described herein relate to a knife, wherein the one or more apertures have a shape and dimensions coinciding with the M-LOK accessory interface standard.

In some aspects, the techniques described herein relate to a knife, wherein the one or more apertures include three apertures.

In some aspects, the techniques described herein relate to a knife, wherein the first handle scale (also referred to as "knife scale", or simply "scale") includes a hook passing at least partially through a first of the one or more apertures in the tang and wherein the second handle scale includes a second hook passing at least partially through the first of the one or more apertures in the tang. In some embodiments, the first and second hooks are configured to engage with each other and at least partially hold the first and second handle scales together until the scale release actuator is depressed.

In some aspects, the techniques described herein relate to a knife, wherein the second handle scale includes a third hook passing at least partially through a second of the one or more apertures in the tang, and wherein the second handle scale includes a fourth hook passing at least partially through the second of the one or more apertures in the tang. In some embodiments, the third and fourth hooks are configured to engage with each other and at least partially hold the third and fourth handle scales together until the scale release actuator is depressed. In some embodiments, the first and third hooks are oriented toward one end (e.g., distal end) of the knife, and the second and fourth hooks are oriented toward another end (e.g., proximal end) of the knife.

In some aspects, the techniques described herein relate to a knife, wherein, when in a depressed position, the scale release actuator allows the second handle scale to clear a top of the scale release actuator and slide rearward and then upward to remove it from the tang, and once the second handle scale is removed, the first handle scale can be removed in a direction perpendicular to a face or side of the tang.

In some aspects, the techniques described herein relate to a knife, wherein the first handle scale further includes a tower that passes at least partially through one of the one or more apertures in the tang, and wherein the tower is positioned against an end of the one of the one or more apertures such that the first handle scale cannot slide rearward but can be removed perpendicularly to the face or side of the tang once the second handle scale is removed.

In some aspects, the techniques described herein relate to a knife, wherein the scale release actuator includes a user interface member atop a spring.

In some aspects, the techniques described herein relate to a knife, wherein the spring includes a flexible arm arranged at an angle between the user interface member and the first handle scale, and wherein the flexible arm is configured to bias the user interface member at least partially into the opening in the second handle scale.

In some aspects, the techniques described herein relate to a knife sheath including: a sheath body with one or more releasable locks configured to releasably hold a knife at least partially within the sheath body; a compression bracket having an aperture; and a rotatable clip passing through the aperture and having a portion that is compressed against the sheath body by the compression bracket thereby locking the rotatable clip into a desired orientation or rotational position relative to the sheath body.

In some aspects, the techniques described herein relate to a knife sheath, wherein the compression bracket includes two halves that when pulled together perform the locking.

In some aspects, the techniques described herein relate to a knife sheath, wherein the rotatable clip and the compression bracket include teeth that interface with each other to lock the rotatable clip into the desired orientation relative to the sheath body.

In some aspects, the techniques described herein relate to a knife sheath, wherein the teeth of the compression bracket are arranged around a circumference of the aperture in the compression bracket.

In some aspects, the techniques described herein relate to a knife sheath, wherein the rotatable clip includes a flexible arm configured to form a friction fit with a belt, pants, or other user clothing item.

In some aspects, the techniques described herein relate to a knife sheath, wherein the rotatable clip includes at least one elongated opening configured for engagement with a sling.

DETAILED DESCRIPTION

The word “exemplary” is used herein to mean “serving as an example, instance, or illustration.” Any embodiment described herein as “exemplary” is not necessarily to be construed as preferred or advantageous over other embodiments.

The present disclosure relates generally to a fixed knife and sheath. More specifically, but without limitation, the present disclosure relates to removable handle scales for a fixed knife as well as a sheath that can effectively couple to the fixed knife even when the handle scales are removed.

For the purpose of this document, the terms “front” and “distal” shall refer to a side or direction associated with a direction of a blade tip of the knife, or alternatively a side or direction associated with a direction of intended use. Additionally, the terms “rear” and “proximal” shall refer to a side or direction associated with the intended bracing of the knife (i.e., where the knife is held by the user), or alternatively the handle end of the knife.

As used herein, the terms “scales”, “handle scales”, “removable scales”, and “knife scales” may be used interchangeably throughout the disclosure. Additionally, the term “knife assembly” may be used to refer to either of a knife and sheath assembly (i.e., where the knife with removable handle scales is inserted into the sheath) or just the knife. That is, a knife assembly may include the knife and optionally the sheath assembly.

Figure 1:
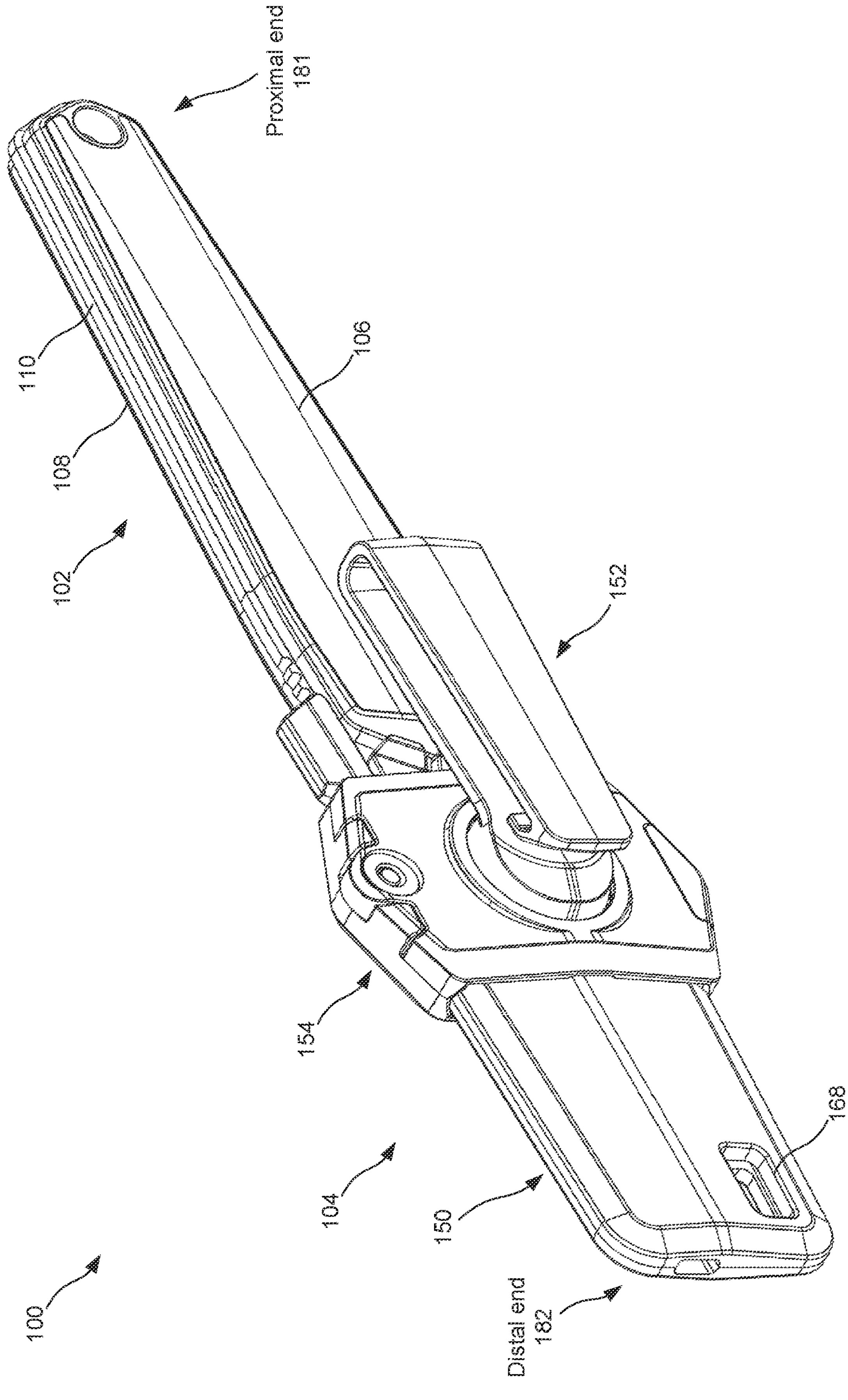
FIG. 1 shows a perspective view of a knife and sheath assembly for a fixed blade knife, according to various aspects of the disclosure.
Figure 2:
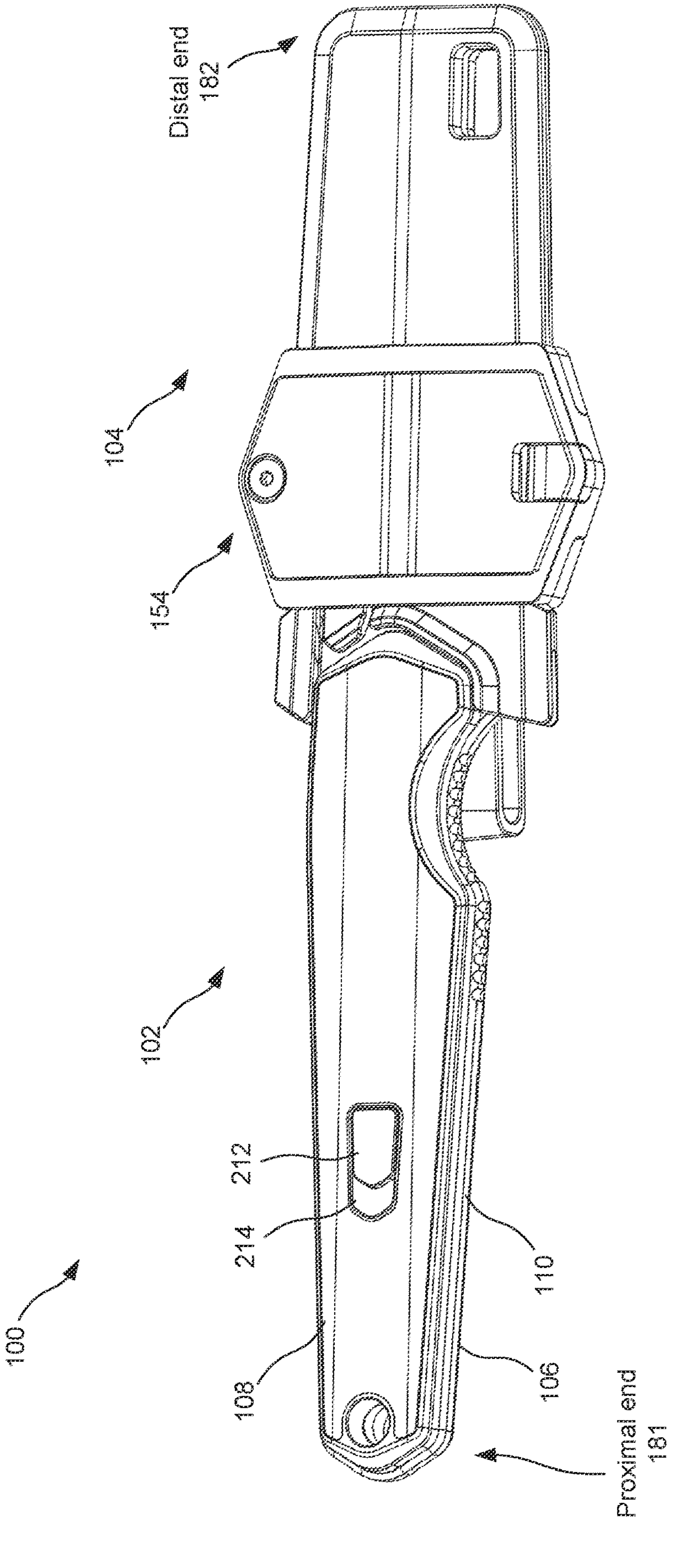
FIG. 2 shows a side view of the knife and sheath assembly of FIG. 1, according to various aspects of the disclosure.

FIGS. 1 and 2 show an embodiment of a knife and sheath assembly 100 (or simply, knife assembly 100) for a fixed blade knife, according to various aspects of the present disclosure. As seen in FIG. 1, the knife assembly 100 includes a proximal end 181, a distal end 182, a fixed blade knife 102 (also referred to as knife 102), a sheath 104, a plurality of handle scales 106 and 108, and a tang 110. In this example, the sheath 104 further includes a sheath body 150, a rotatable clip 152, and a compression bracket 154. In some cases, the compression bracket 154 may comprise or may be formed by a first half 156 of the bracket and a second half 158 of the bracket. In some cases, the sheath body 150 includes one or more engagement features (e.g., releasable locks) configured to releasably hold the knife 102 at least partially within the sheath body 150. In some cases, the sheath body 150 is shaped and sized to receive all or a majority of the length of the cutting edge or blade of the knife 102.

Figure 13:
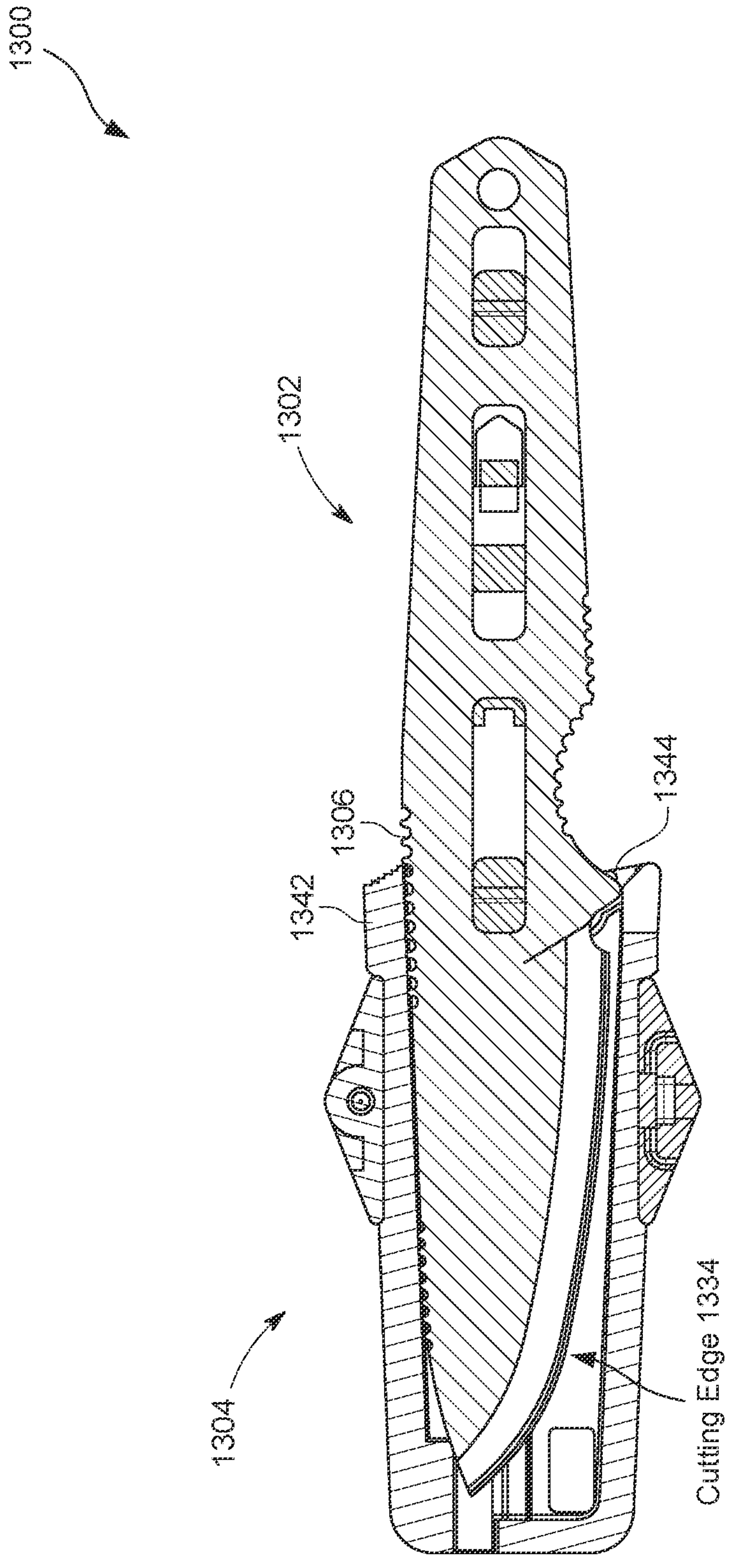
FIG. 13 illustrates a cross-sectional view of the knife and sheath assembly of FIG. 1 showing engagement features for releasably locking the knife in the sheath, according to various aspects of the disclosure.

In some embodiments, the fixed blade knife 102 is shaped and sized such that at least a portion of the blade can couple into the sheath 104. Specifically, but without limitation, the fixed blade knife 102 can couple into the sheath 104 via one or more engagement features of the sheath 104, further described below in relation to FIGS. 13 and 17. In some examples, the one or more engagement features of the sheath 104 may be configured to interface with spines of the knife 102, where the spines may be positioned along the top and/or bottom edges of the knife. For example, FIG. 13 depicts a cross sectional view of a knife assembly 1300 showing one or more engagement features 1342, 1344 of the sheath 104. As seen in FIG. 13, engagement feature 1342 is positioned along a top edge of the sheath 104 and engagement feature 1344 is positioned along a bottom edge of the sheath 104. In some instances, the engagement between the engagement features 1342, 1344 of the sheath 1304 and the spines on the knife is independent of whether the handle scales (not shown in FIG. 13 but shown as handle scales 106 and 108 in FIG. 1) are in place. That is, the engagement is not influenced by the handle scales 106 and 108 either being in place or not.

Returning to FIGS. 1 and 2, the knife 102 includes a first handle scale 106 (or simply, scale 106) removably coupled to a second handle scale 108 (or simply, scale 108). In some embodiments, the first and second handle scales 106 and 108 may be releasably coupled to each other through one or more apertures (not visible in FIGS. 1-3, but shown as apertures 416 in FIG. 4) in a tang 110 of the knife 102. Furthermore, the first and second handle scales 106 and 108 may be positioned on either side of the tang 110 (i.e., may sandwich the tang 110 therebetween). As shown in FIG. 2, the first handle scale 106 may also include a scale release actuator 212 that is biased toward an outside of the second handle scale 108, where the scale release actuator 212 is biased to a position that is at least partially within an opening 214 in the second handle scale 108 such that the first and second handle scales 106, 108 are locked together until the scale release actuator 212 is sufficiently depressed to clear an inner surface of the second handle scale 108. Once the scale release actuator 212 has been sufficiently depressed, the second scale 108 can slide rearward thereby (e.g., shown by arrow 778 in FIG. 7) enabling the first and second handle scales 106, 108 to be disengaged from each other. Once disengagement occurs, the first and second handle scales 106, 108 can be removed from the tang 110.

Figure 3:
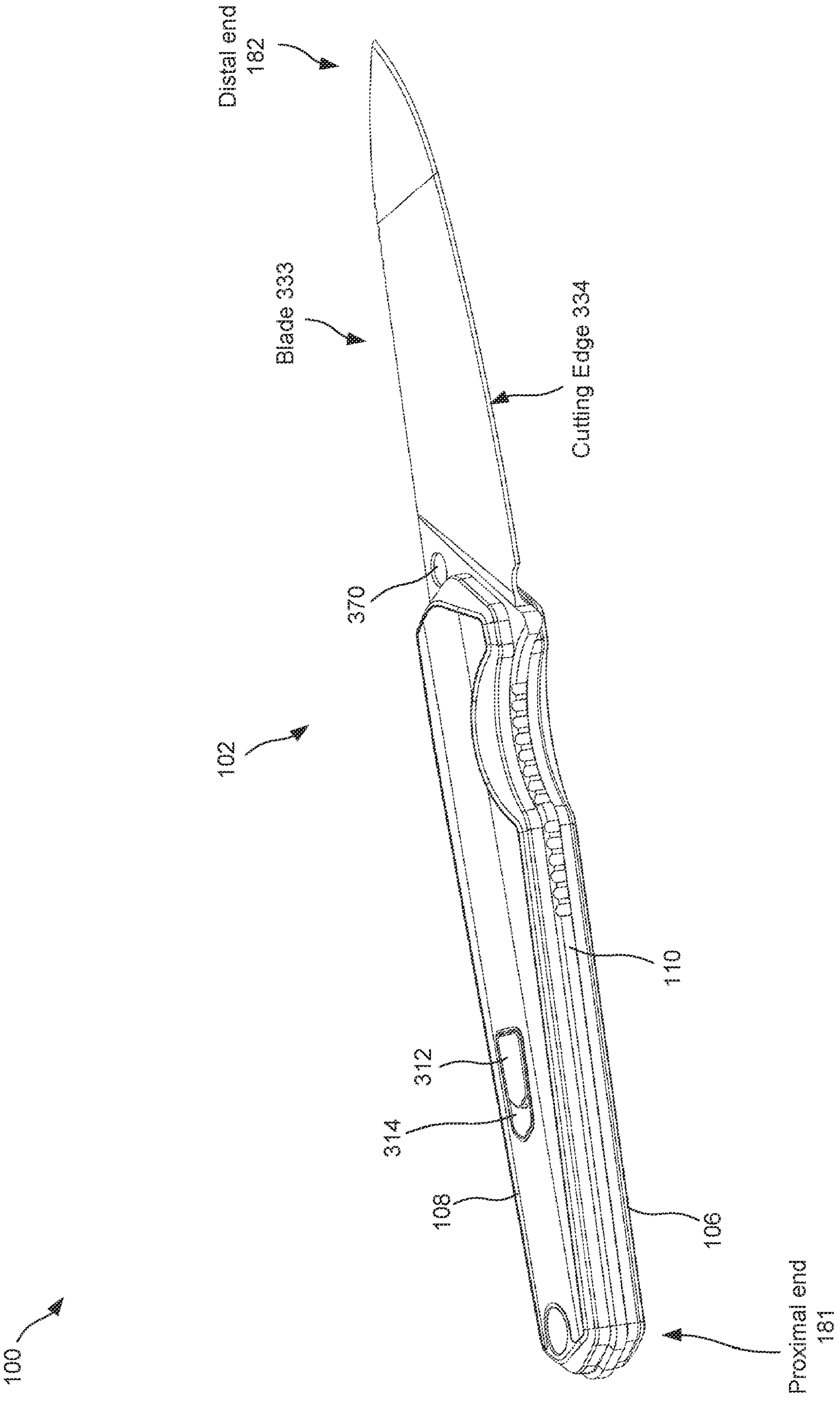
FIG. 3 shows a perspective view of the assembly of FIG. 1 with the sheath removed, according to various aspects of the disclosure.

FIG. 3 shows a view of the knife assembly 100 in FIGS. 1 and/or 2 without the sheath, according to various aspects of the present disclosure. As seen, the knife assembly 100 includes a fixed blade knife 102 (also referred to as knife 102), a tang 110, and a plurality of handle scales 106 and 108, where each handle scale is positioned on one side of the tang 110 such that the tang 110 is “sandwiched” between the handle scales 106 and 108. The knife 102 also includes a blade 333 having a cutting edge 334, where the blade 333 and cutting edge 334 extend between the distal ends of the handle scales and the distal end 182 of the knife 102. In some cases, one of the first handle scale 106 and the second handle scale 108 may include an aperture 314 through which a scale release actuator 312 can at least partially pass through when the handle scales are locked and engaged with the tang 110. For example, in FIG. 3, the second handle scale 108 includes an aperture 314 that is shaped and sized to receive at least a portion of a scale release actuator 312. Specifically, but without limitation, at least a portion of the scale release actuator 312 passes through the aperture 314 when the handle scales 106, 108 are locked and engaged with the tang 110. In some cases, the tang 110 can include one or more apertures (e.g., apertures 416-*a*, 416-*b*, 416-*c* in FIG. 4), and the scale release actuator 312 can pass through one of these (e.g., aperture 416-*b* in the illustrated embodiment in FIG. 4) when the handle scales 106 and 108 are locked and engaged with the tang 110.

In some cases, the knife 102 may include one or more dimples 370 (optional) for interfacing with one or more engagement features (e.g., circular protrusions) on an inside of a sheath body, which can help secure at least a portion of the knife within the sheath body, further described below in relation to FIGS. 17-18.

Figure 4:
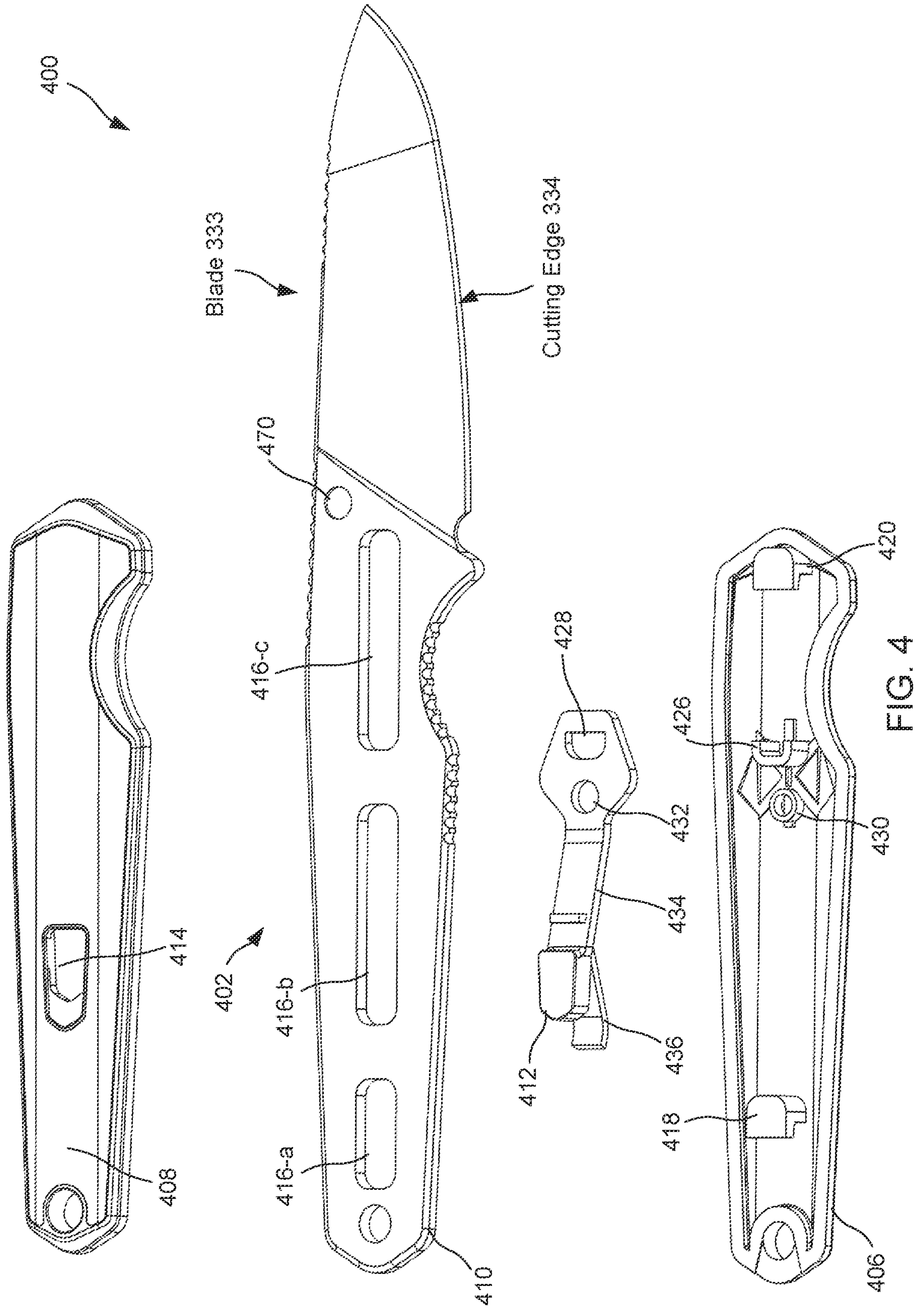
FIG. 4 shows an exploded view of the knife of FIG. 3, according to various aspects of the disclosure.

FIG. 4 shows an exploded view of a knife assembly 400, according to various aspects of the present disclosure. The knife assembly 400 in FIG. 4 may be similar or substantially similar to the knife assembly 100 described above in relation to FIGS. 1-3, or any of the other knife assemblies described herein. The exploded view of the knife assembly 400 depicts a fixed blade knife 402 comprising a plurality of handle scales 406 and 408, a tang 410, and a scale release actuator 412 as distinct components. In some cases, the blade 334 having the cutting edge 334 is formed near the distal end of the tang 410.

In this example, the fixed blade knife 402 includes a first handle scale 406 and a second handle scale 408, where the second handle scale 408 includes an aperture 414 (also shown as aperture 314 in FIG. 3) through which the scale release actuator 412 can at least partially pass through when the handle scales 406, 408 are locked and engaged with the tang 410. Furthermore, the handle scales 406 and 408 are arranged such that at least a portion of the length of the tang 410 is sandwiched between the handle scales (i.e., each of the handle scales is adjacent one side of the tang 410). When installed over the tang 410, the handle scales 406 and 408 extend from the proximal end of the tang 410 to the proximal end of the blade 333. In some embodiments, the tang 410 can further include one or more apertures 416 (e.g., apertures 416-*a*, 416-*b*, and/or 416-*c*), and the scale release actuator 412 can be shaped and sized to pass through one of said apertures 416 (e.g., middle aperture or aperture 416-*b* in the illustrated embodiment).

In some cases, one or more of the other apertures (e.g., aft aperture or aperture 416-*a*, fore aperture or aperture 416-*c*) can be shaped and sized to receive one or more hooks 418, 420 positioned on an interior face of one or more of the handle scales 406, 408. For example, FIG. 4 illustrates the interior face of the handle scale 406 comprising a plurality of hooks 418 and 420, where a first one of the hooks 418 is positioned near a proximal end of the handle scale 406 and a second one of the hooks 420 is positioned at or near the distal end of the handle scale 406. In some cases, the fore aperture 416-*c* can be shaped and sized to allow passage of the hook 420, while the aft aperture 416-*a* can be shaped and sized to allow passage of the hook 418. While not visible from this angle, the second handle scale 408 may also include one or more similar hooks positioned on an interior face of the scale and configured to interface with one or more of the apertures 416, further described below in relation to FIG. 5. In some embodiments, opposing hooks (e.g., hook 418 of handle scale 406 and another hook of handle scale 408; hook 420 of handle scale 406 and another hook of handle scale 408) can pass through a common one of the apertures 416 (e.g., aperture 416-*a*, aperture 416-*c*) and be snapped together to lock the handle scales 406 and 408 in position relative to each other and the tang 410. Alternatively, opposing hooks of the first and second handle scales can be hooked together, for instance, by sliding one of the two handle scales forward until the scale release actuator 412 snaps into the aperture or opening 414, which allows the handle scales 406, 408 to be locked in position relative to each other and the tang 410.

In some cases, to further enhance the coupling of the tang 410 and the handle scales and/or to reduce longitudinal motion of the handle scales 406, 408 relative to the tang 410, a tower or protrusion 426 can be provided on the interior face of at least one of the handle scales (e.g., handle scale 406). For example, FIG. 4 shows a tower or protrusion 426 positioned on the interior face of the handle 406, where the tower 426 is shaped and sized to be received within the same aperture 416 (e.g., aperture 416-*c*) as one of the hooks (e.g., hook 420). In one non-limiting example, the tower 426 can be received within the same aperture 416-*c* as the hook 420, where the tower 426 is configured to press against one end (e.g., proximal end) of the aperture 416-*c* and the hook is configured to press against an opposing end (e.g., distal end) of the aperture 416-*c* when the handle scales 406 and 408 are installed over the tang 410. In some cases, the spacing between the tower 426 and the hook 420 is selected to be approximately equal to (or slightly less) than the longitudinal length of the corresponding aperture 416. Additionally, or alternatively, the interior face(s) of one or more of the handle scales 406 and 408 can include another tower (not shown) that is shaped and sized to be received within another aperture (e.g., aperture 416-*a*) of the tang 410. For example, the interior face of the handle 406 can include a tower or protrusion (similar to tower 426) that can be received within the same aperture 416-*a* as hook 418, which can help prevent or reduce longitudinal motion of the handle scales relative to the tang 410. In this case, the other tower and the hook 418 can be spaced apart such that the other tower presses against the proximal end of the aperture 416-*a* while the hook 418 presses against the distal end of the aperture 416-*a* when the handle scales are installed over the tang 410.

Figure 6:
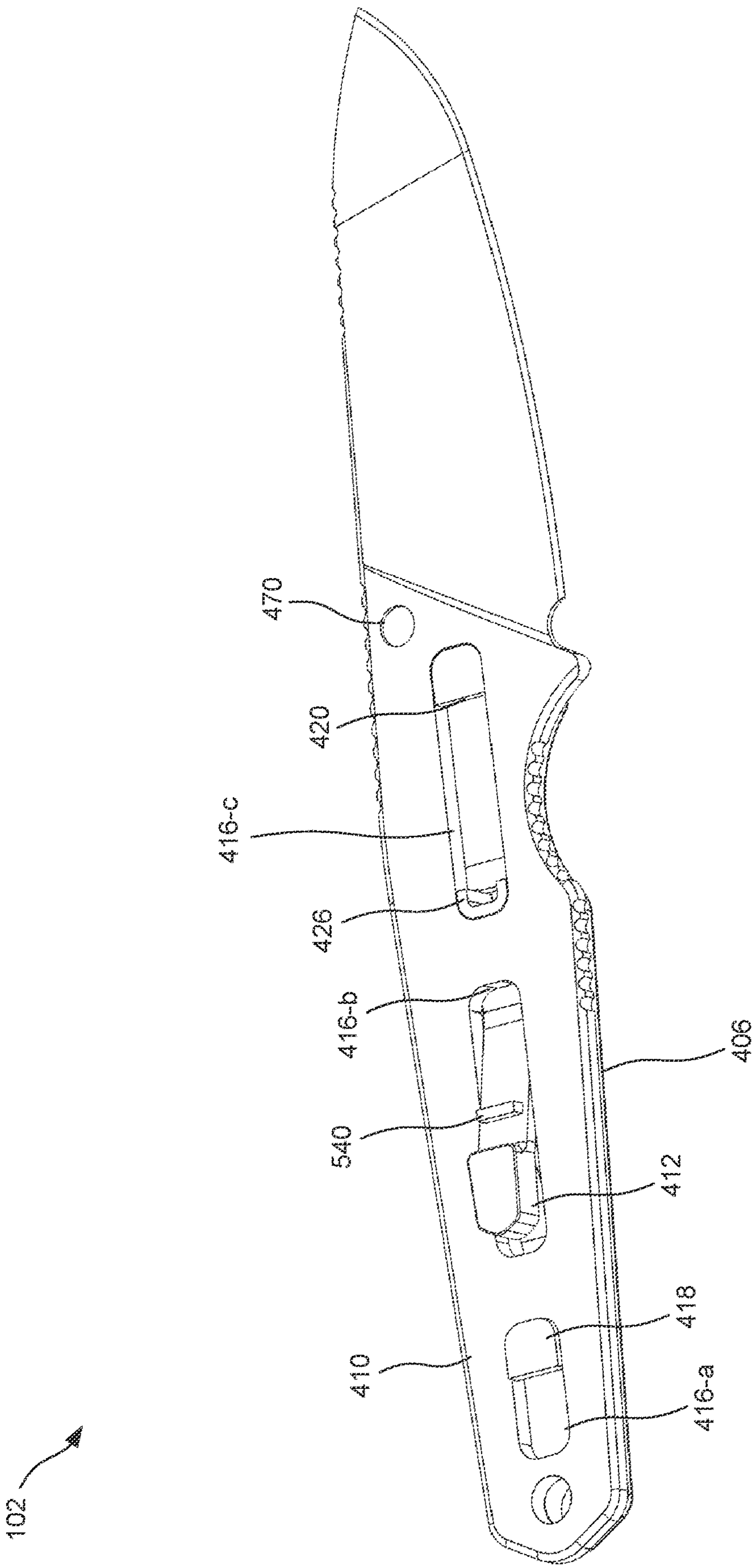
FIG. 6 illustrates the knife of FIG. 1 with the second handle scale removed to better show the first handle scale's interfacing with apertures in the tang, according to various aspects of the disclosure.

As can be seen in FIG. 4, one or more of the hooks 418, 420, and tower 426 are roughly rectangular in shape with two beveled or curved corners that substantially match or fit the curvature of corners of the corresponding apertures 416. An alternative view of the tower 426 and the hook 420 fitting into one of the apertures 416 (e.g., fore aperture 416-*c*) is shown in FIG. 6, where the second handle scale has been removed to improve visibility of the interface between the tang 410 and the tower/protrusion 426 and hook 420 of the handle scale 406, described in further detail below.

It should be noted that FIG. 4 only depicts two hooks 418, 420 on the inside of the first handle scale 406 but does not show the hooks on the inside of the second handle scale 408. However, FIGS. 5 and 8 depict the hooks on the inside of both the first and second handle scales 406 and 408, respectively.

In some cases, the knife 402 may include one or more dimples 470 (optional) for interfacing with one or more engagement features (e.g., circular protrusions) on an inside of a sheath body, which can help secure at least a portion of the knife within the sheath body, further described below in relation to FIGS. 17-18.

Figure 5:
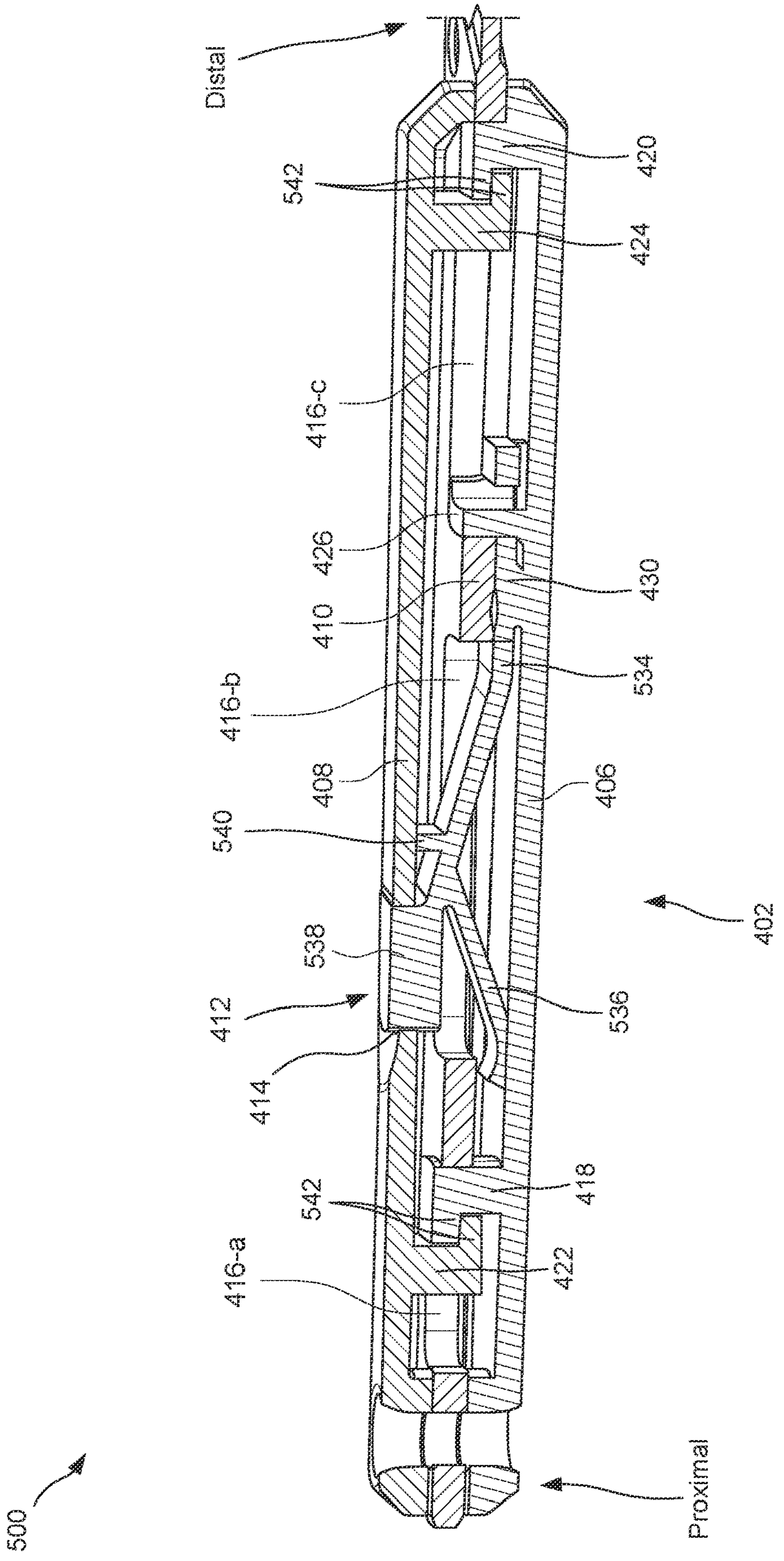
FIG. 5 illustrates a cross-sectional view of the knife of FIGS. 1 and/or 3, according to various aspects of the disclosure.

Turning now to FIG. 5, which illustrates a cross-sectional view 500 of the tang area (i.e., handle portion) of the fixed blade knife 402, according to various aspects of the present disclosure. Specifically, but without limitation, the cross-sectional view 500 shown in FIG. 5 help show how the hooks 418, 420, 422, and 424 interface when the handle scales 406 and 408 are engaged with the knife (i.e., installed on either side of the tang 410). As seen in FIG. 5, the handle scale 406 includes a first hook 418 positioned towards a proximal end and a second hook 420 positioned towards a distal end of the handle scale 406. Here, both the first hook 418 and the second hook 420 include a lip 542, where the lips 542 of the two hooks are oriented towards the proximal end of the knife 402. Additionally, the handle scale 408 includes a third hook 422 positioned towards a proximal end and a fourth hook 424 positioned towards a distal end of the handle scale 408. Here, both the third hook 422 and the fourth hook 424 include a lip 542, where the lips of the two hooks are oriented towards the distal end of the knife 402.

In some cases, the lip 542 on the hook 418 is configured to engage with a corresponding lip on the hook 422, while the lip 542 on the hook 420 is configured to engage with a corresponding lip on the hook 424. As noted above, the lips 542 of the opposing hooks (e.g., hooks 418 and 422; hooks 420 and 424) can be oriented in opposite directions to each other, which allows them to engage with each other as shown in FIG. 5. In some aspects, the engagement of the lips 542 of the hooks 418 and 422 and/or hooks 420 and 424 can help prevent the handle scales 406, 408 from moving perpendicularly (i.e., up-down direction in the page) relative to the tang 410. Because the second handle scale 408 is designed to lock into the first handle scale 406 via a snap connection, or alternatively, via forward sliding, the hooks 418, 420 of the first handle scale 406 face rearward in this example, though those of skill in the art can utilize appropriate hook directions based on the sliding scale selected.

FIG. 5 also depicts an example of the scale release actuator 412, in accordance with various aspects of the disclosure. In one non-limiting example, the scale release actuator 412 can be implemented as a user interface member 538 atop a spring. In some cases, the spring can bias the user interface member 538 toward an outer surface of the second handle scale 408 (i.e., away from the tang/blade 410). In the illustrated embodiment, the spring comprises two arms 534, 536 that are angled relative to each other and form an obtuse angle therebetween. When the scale release actuator 412 is depressed toward the tang 410 (e.g., into the aperture 414 in FIG. 4) in order to remove the handle scales 406, 408, the angle between the two angled arms 534, 536 increases and the arms 534, 536 act as a spring by gradually building a stronger resistive force to this depression (or a stronger bias toward the outer surface of the second scale 408). In some instances, one end of one of the angled arms 534 or 536 can be coupled to the base of the scale release actuator 412 and may be configured to pivot around this connection point, while the other angled arm 534 or 536 may include a "free" end that can slide along the inside surface of the first handle scale 406 as the scale release actuator 412 is depressed. In some embodiments, a stop 540 can be arranged atop one of the arms 534 or 536, where the stop 540 can be configured to press against an inside surface of the second handle scale 408 and thereby prevent the scale release actuator 412 from being biased too far through the opening or aperture 414. It should be noted that the position of stop 540 adjacent to the inside surface of the second handle scale 408 is exemplary only and not intended to limit the scope and spirit of the present disclosure. For instance, in some cases, the stop 540 can be arranged such that it is configured to press against an inside surface of the first handle scale 406 and prevent the scale release actuator 412 from being biased too far through the aperture/opening, for instance, when the scale release actuator 412 extends through an aperture/opening in the second handle scale 408. Those of skill in the art will further appreciate that the illustrated biasing means (e.g., a spring formed by two angled arms with an obtuse angle therebetween) is only one of numerous mechanisms that can be used to bias the scale release actuator 412 toward an outer surface of the second handle scale 408. For instance, in some embodiments, a leaf spring or coil spring could also be employed to achieve this outward biasing away from the tang 410. In another embodiment, a single arm (e.g., only one of arms 534 or 536) can be used instead of the two that are illustrated.

Turning now to FIG. 6, which illustrates the knife 102 with one of the handle scales removed, in accordance with one or more implementations. Specifically, FIG. 6 shows a detailed view of the interface between the tower/protrusion 426 and hooks on the inside surface of the handle scale 406 and the corresponding apertures of the tang 410, according to various aspects of the present disclosure. Here, the second handle scale (e.g., handle scale 408 in FIG. 4) is not shown to improve visibility of the interface. As seen, the tang 410 includes a plurality of apertures (e.g., aft or first aperture 416-*a*, middle or second aperture 416-*b*, fore or third aperture 416-*c*) that are aligned or substantially aligned with each other (i.e., longitudinal axis passing through said apertures are aligned or substantially aligned with each other). In some cases, the handle scale 406 may include one or more hooks (e.g., hooks 418, 420) and a tower 426 protruding from its inside or inner surface and towards the tang 410. FIG. 6 also depicts the scale release actuator 412, where the scale release actuator 412 is configured to engage or interface with one of the apertures (e.g., middle aperture 416-*b*).

In some embodiments, the scale release actuator 412 can include a cutout (e.g., shown as cutout 428 in FIG. 4) having a same or substantially a same profile as the tower 426. Such a design allows the tower 426 to hold the base of the scale release actuator 412 in place even when the actuator 412 is depressed. An optional protrusion (e.g., shown as circular protrusion 430 in FIG. 4) may be provided, where the circular protrusion 430 may be shaped and sized to fit the cutout 432 in the base of the scale release actuator 412. This can help retain the base of the scale release actuator 412 in a constant position (i.e., prevent longitudinal and/or lateral movement for instance).

In some embodiments, the one or more apertures (e.g., apertures 416) of the tang 410 can be rectangular and can have the same or different lengths. Furthermore, the one or more apertures 416 of the tang 410 can have the same or different widths. Typically, the longitudinal axis's passing through each of the apertures are aligned or substantially aligned with each other. In some embodiments, the rectangular shape of the apertures 416 can be shaped and sized to coincide with a standard rail or accessory interface such as MAGPUL'S M-LOK standard. In some instances, the one or more apertures 416 may have rounded or curved corners. It should be noted that other variations/configurations of the shapes, dimensions, relative sizes, positions (i.e., with respect to the proximal and distal ends of the handle portion of the tang), etc., for the apertures 416 are contemplated in different embodiments and the examples described herein are not intended to limit the scope and/or spirit of the present disclosure.

Figure 7:
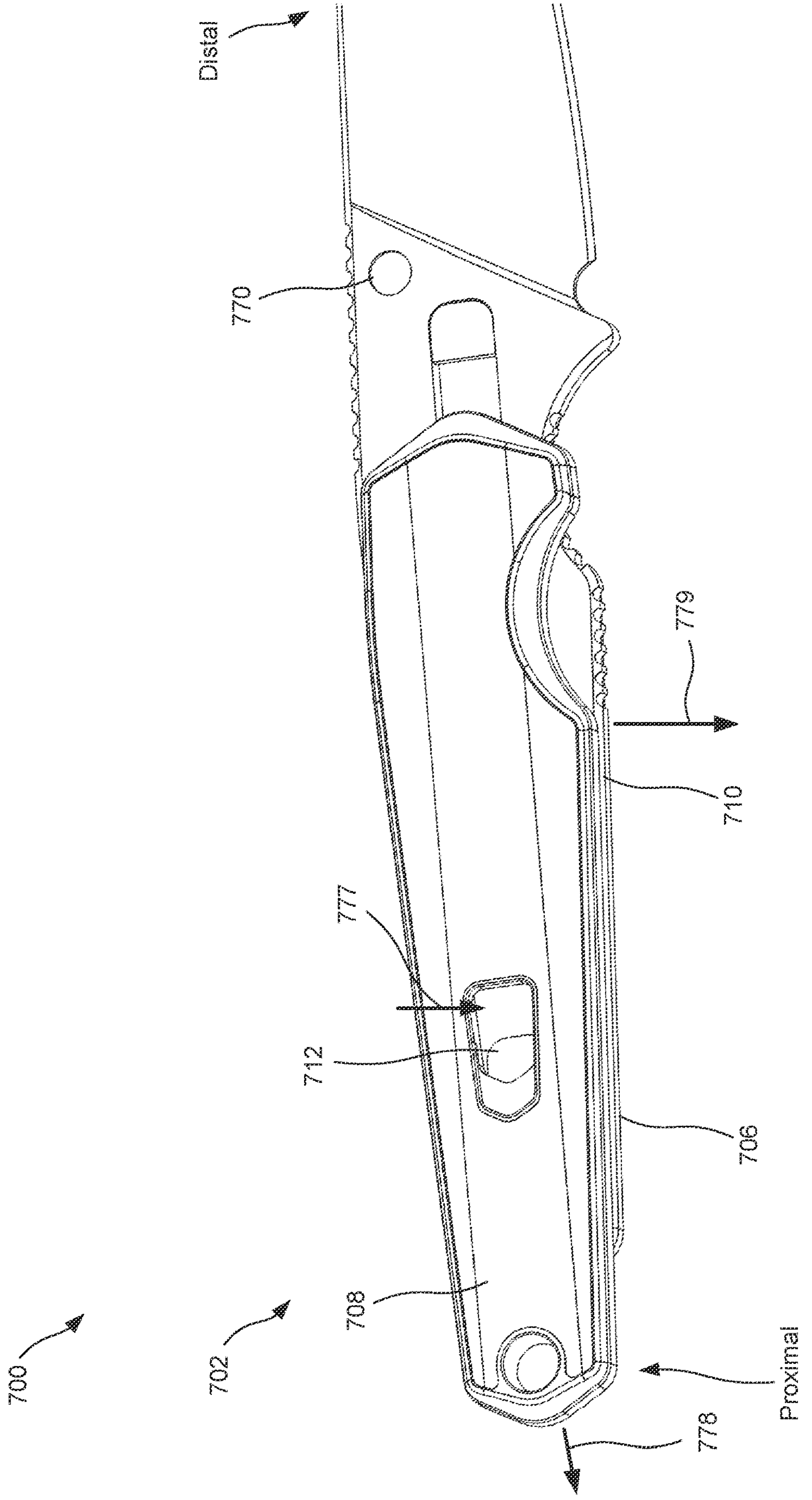
FIG. 7 illustrates the second handle scale being slid rearward after the scale release actuator has been depressed, according to various aspects of the disclosure.

FIG. 7 illustrates a knife assembly 700, according to various aspects of the present disclosure. The knife assembly 700 may be similar or substantially similar to the knife assemblies 100 and/or 400 described above, or any of the other knife assemblies described herein. As seen, the knife assembly 700 comprises a fixed blade knife 702 including a first handle scale 706, a second handle scale 708, at least one dimple 770 on a side of the blade, and a tang 710 positioned between the inner surfaces of the first and the second handle scales. In this example, the second handle scale 708 is being slid rearward (as shown by arrow 778) after the scale release actuator 712 has been depressed (as shown by arrow 777). Thus, as seen, when the scale release actuator 712 is sufficiently depressed to clear the inside surface of the second handle scale 708, the second scale 708 can be slid rearward (arrow 778). In FIG. 7, arrow 779 depicts the direction in which the first handle scale 706 can be removed, where the first handle scale 706 can be removed at the same time as or after the second handle scale 708 has been removed. Alternatively, the first handle 706 can be removed before the second handle scale 708.

Figure 8A:
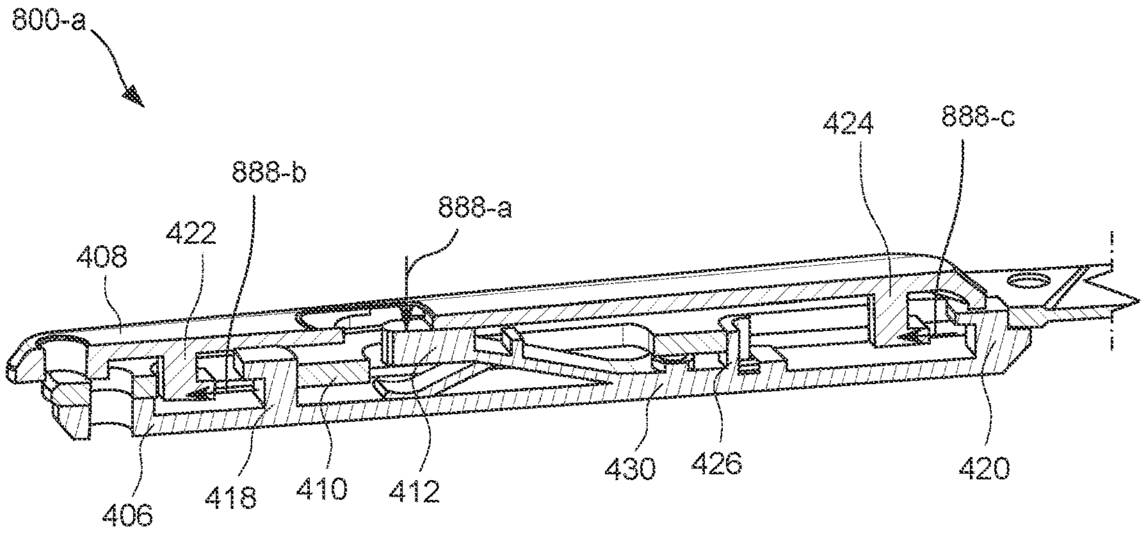
FIG. 8A illustrates a cross-sectional view of a knife showing the rearward sliding of the second handle scale once the scale release actuator has been sufficiently depressed, according to various aspects of the disclosure.
Figure 8B:
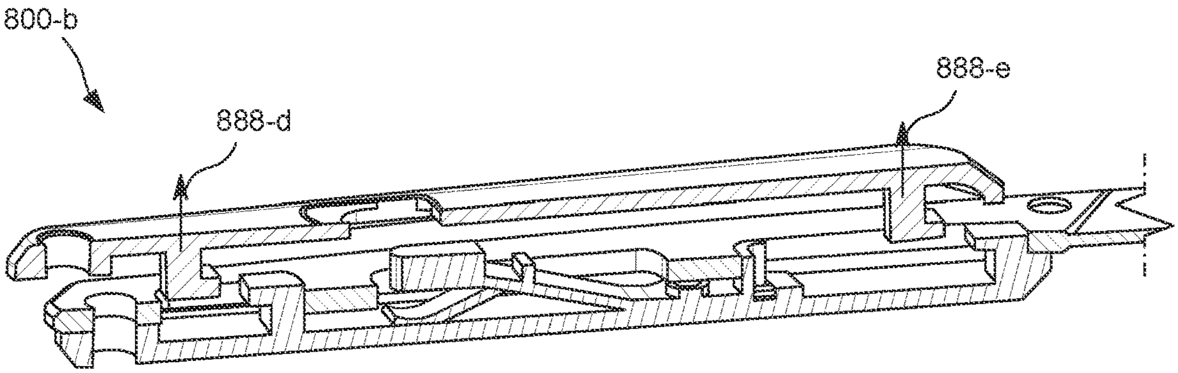
FIG. 8B illustrates another cross-sectional view of a knife showing removal of the second handle scale after the second handle scale has been sufficiently slid rearward to clear the hooks of the first handle scale, according to various aspects of the disclosure.
Figure 8C:
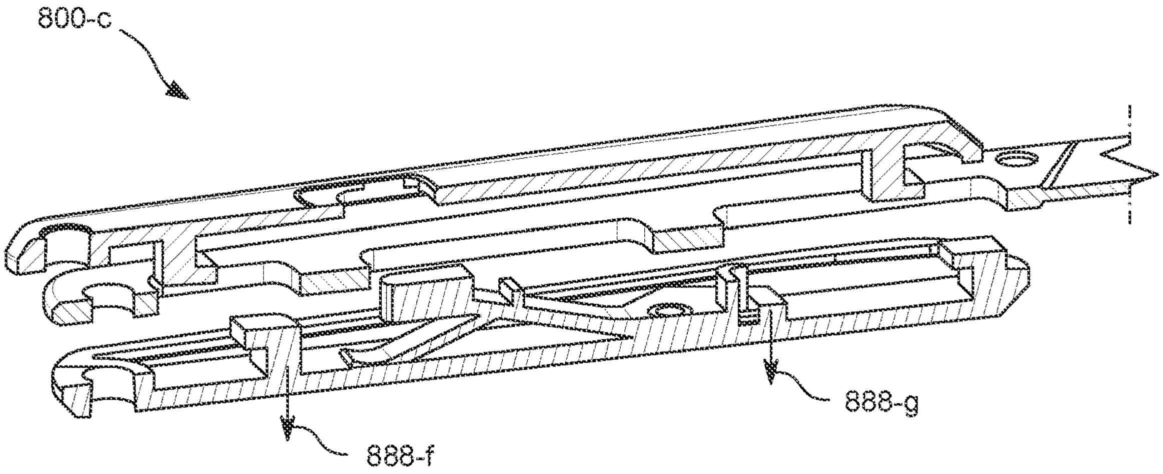
FIG. 8C illustrates another cross-sectional view of a knife showing removal of the first handle scale after the second handle scale has been sufficiently slid rearward, according to various aspects of the disclosure.

FIG. 8A illustrates a cross sectional view 800-*a* of the knife assembly of FIG. 5 showing the rearward sliding of the scale 408, according to various aspects of the present disclosure. Similar to FIG. 7, FIG. 8A also shows the same rearward sliding (arrow 888-*b*) of the second handle scale 408 once the scale release actuator 412 has been sufficiently depressed (arrow 888-*a*). As shown, once the second handle scale 408 is moved rearward such that the hooks 418, 420, 422, 424 clear each other, the second handle scale 408 can be removed in a direction (arrows 888-*d* and 888-*e*) roughly perpendicular to the tang 410 as seen in FIG. 8B, and/or the first handle scale 706 can be removed in a direction (arrows 888-*f* and 888-*g*) roughly perpendicular to the tang 410 as seen in FIG. 8C. It should be noted that, the position of the tower 426 and the hook 420 such that they contact opposing ends of one of the apertures 416 (e.g., aperture 416-*c*) in the tang 410 means that the second handle scale 408 cannot be slidingly removed from the tang 410. Instead, the second handle scale 408 must be removed in a direction perpendicular to the tang 410. Despite this illustration, the hooks 418 and 422, and hooks 420 and 424 can be configured to connect or mate by snapping together.

Figure 9:
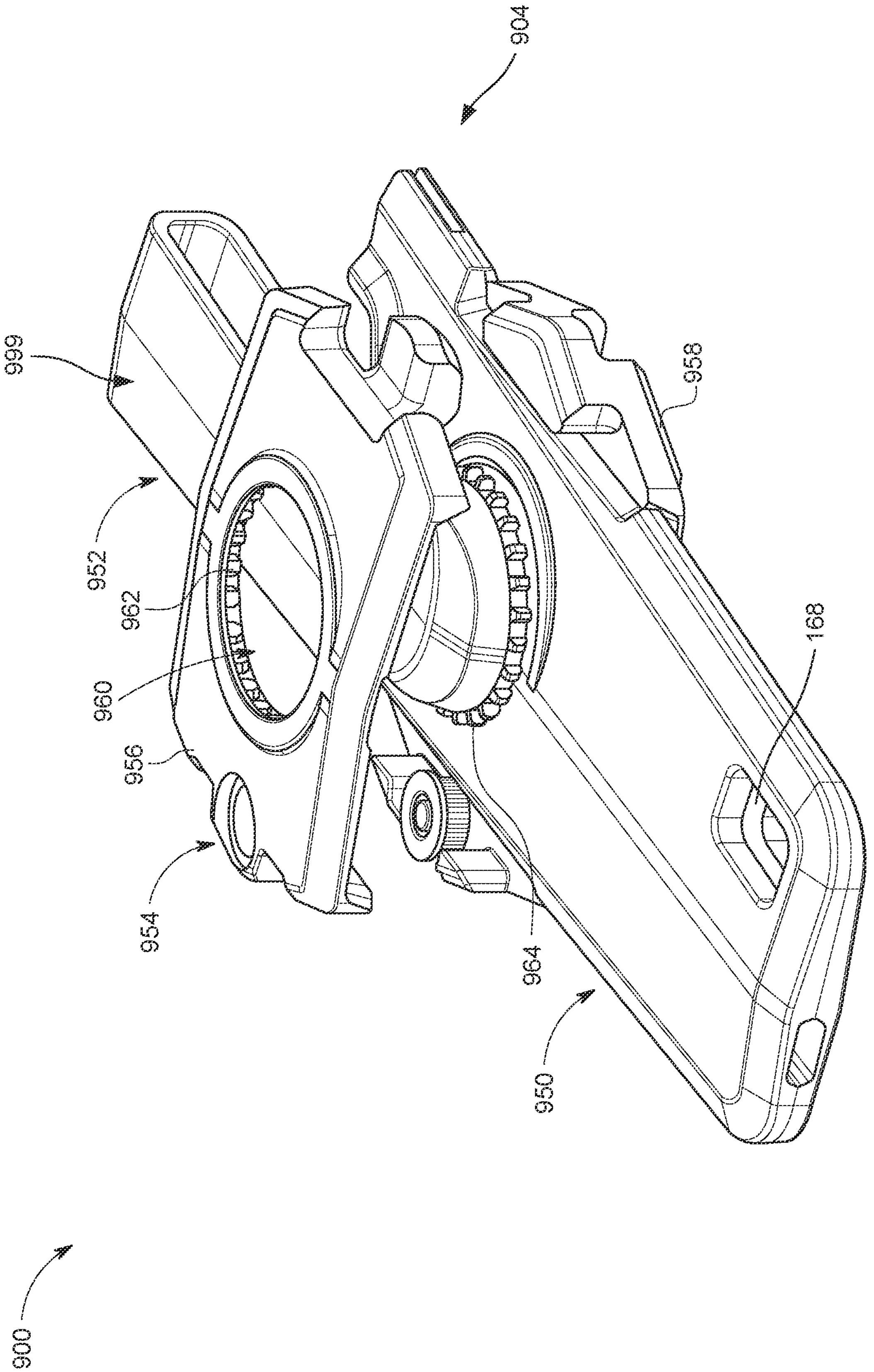
FIG. 9 illustrates an exploded view of the sheath of FIG. 1, according to various aspects of the disclosure.

FIG. 9 illustrates an exploded view 900 of a sheath 904, according to various aspects of the disclosure. The sheath 904 may implement one or more aspects of the sheath 104 described above. As seen, the sheath 904 includes a sheath body 950, a rotatable clip 952, and a compression bracket 954 comprising or formed by a first half 956 of the bracket and a second half 958 of the bracket. In some examples, the sheath body 904 further includes one or more releasable locks that are configured to releasably hold a knife (e.g., fixed blade knife 102) at least partially within the sheath body 950. For instance, FIG. 13 shows a cross section of a sheath 1304 holding a knife 1302 and a plurality of engagement features 1342 and 1344 for engaging with the knife 1302.

Returning to FIG. 9, in some embodiments, at least a portion of the rotatable clip 952 is shaped and sized to pass through an aperture 960 in the compression bracket 954. The rotatable clip 952 also has a portion that is compressed against the sheath body 950 by the first half of the bracket 956, which serves to lock the rotatable clip 952 into a desired orientation relative to the sheath body 950. When drawn together, the first and second halves 956 and 958, respectively, of the compression bracket 954 are configured to compress or "sandwich" a portion of the rotatable clip 952 against the sheath body 950. Moreover, both the first half 956 and the second half 958 may include teeth 962 and 964, respectively, where these teeth 962, 964 are configured to lock together when the halves 956, 958 of the bracket 954 are tightened together, which helps preclude rotational movement of the rotatable clip 952. In some cases, the number of teeth 962 may be equal or substantially equal to the number of teeth 964. Additionally, or alternatively, the teeth 962 and 964 may be of the same or approximately the same size.

Figure 11:
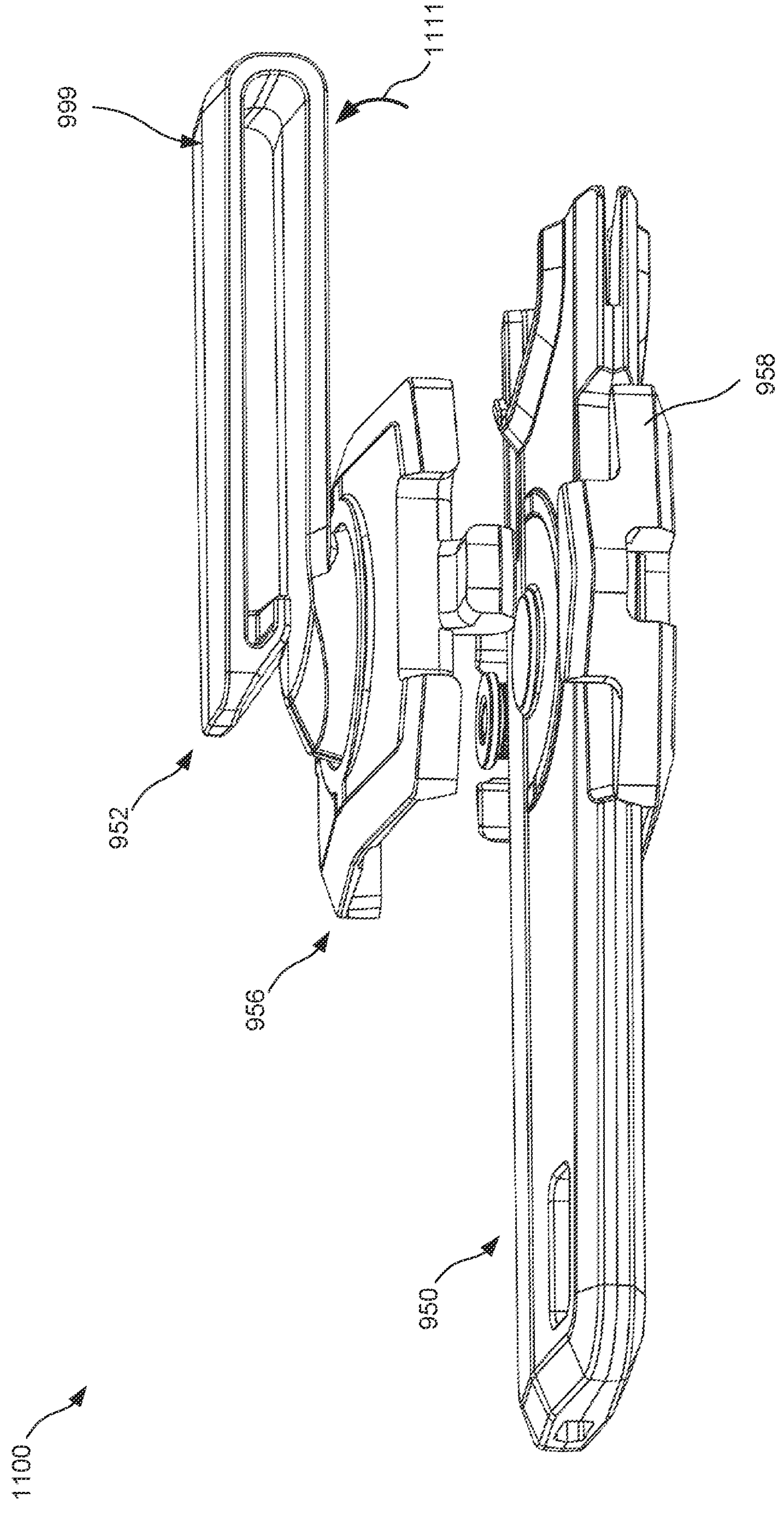
FIG. 11 shows an example of a sheath where the compression bracket is disengaged to allow rotation of the rotatable clip, according to various aspects of the disclosure.

In some examples, the teeth 962 can be arranged around a circumference of the aperture 960 on an inside of the first half 956 of the compression bracket 954. Furthermore, to rotate the clip 952, a user may pull the halves 956, 958 apart (e.g., by loosening one or more fasteners holding them together), for instance, as shown in FIG. 11. With the first half 956 removed from contact with the sheath body 950, the teeth 962, 964 may be disengaged from each other and the rotatable clip 952 may be rotated to a desired angular position.

Figure 12:
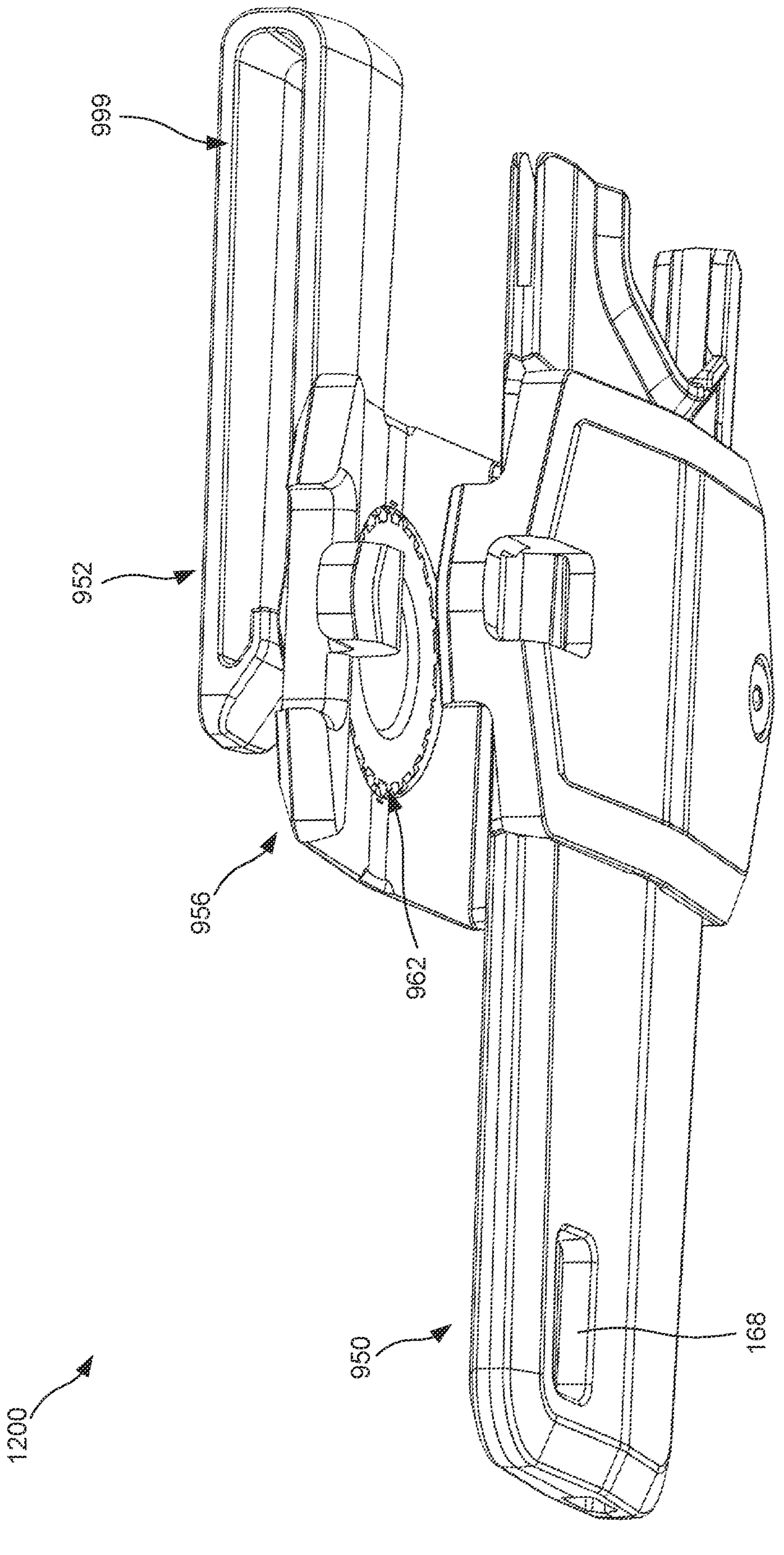
FIG. 12 shows another view of the sheath of FIG. 11 where the teeth of the compression bracket and rotatable clip are visible, according to various aspects of the disclosure.

FIG. 12 illustrates an embodiment (1200) showing the two sets of teeth 962, 964 separated as part of a user's rotation of the rotatable clip 952, according to various aspects of the disclosure. In some cases, the first half 956 of the compression bracket 954 can be reengaged with the second half 958 of the compression bracket 954 and they can be tightened together to compress the teeth 962, 964 together and the first half 956 against the sheath body 950, following which the rotatable clip 952 can be locked into the desired orientation.

As seen in FIGS. 9, 11, and/or 12, the rotatable clip 952 also includes a flexible arm 999 configured to form a friction fit with a belt, pants, or other user clothing item or any other applicable item (e.g., user's backpack, fanny pack or belt bag, etc.) that the clip 952 can be secured too. It should be noted that the illustrated clips (e.g., rotatable clips 152, 952) are just one of many clips that can be implemented, and other types of rotatable or non-rotatable clips are contemplated in different embodiments. Furthermore, the sheath body 950 may also include a strap connector 168 (also shown in FIGS. 1 and 9), where the strap connector 168 can be used to receive a strap, sling, cord, or other mechanism (not shown) that can help attach the sheath 104 to a user clothing item or another applicable item (e.g., backpack).

Figure 10A:
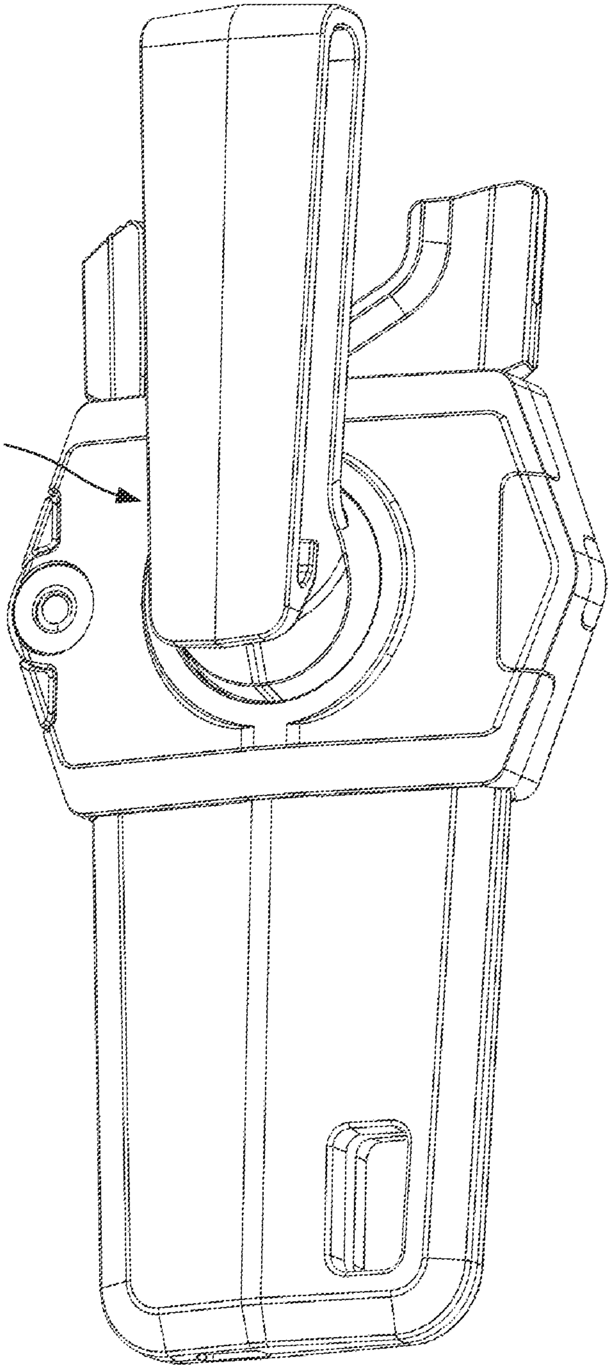
FIG. 10A shows an example of a sheath with a first rotatable clip, according to various aspects of the disclosure.

FIG. 10A shows a side view of the sheath 904 of FIG. 9, according to various aspects of the disclosure. FIG. 10C shows a perspective view 1010 of the rotatable clip 952 of FIG. 9, according to various aspects of the disclosure. As seen, the rotatable clip 952 comprises a plurality of teeth 962 and a flexible arm 999, as described above in relation to FIGS. 9 and/or 12.

FIG. 11 shows an example of a sheath 1100, according to various aspects of the disclosure. The sheath 1100 in FIG. 11 may implement one or more aspects of the sheath 904 described above in relation to FIG. 9. In this example, the compression bracket (i.e., comprising the two halves 956 and 958) is disengaged to allow rotation (shown by arrow 1111) of the rotatable clip 952.

Figure 10B:
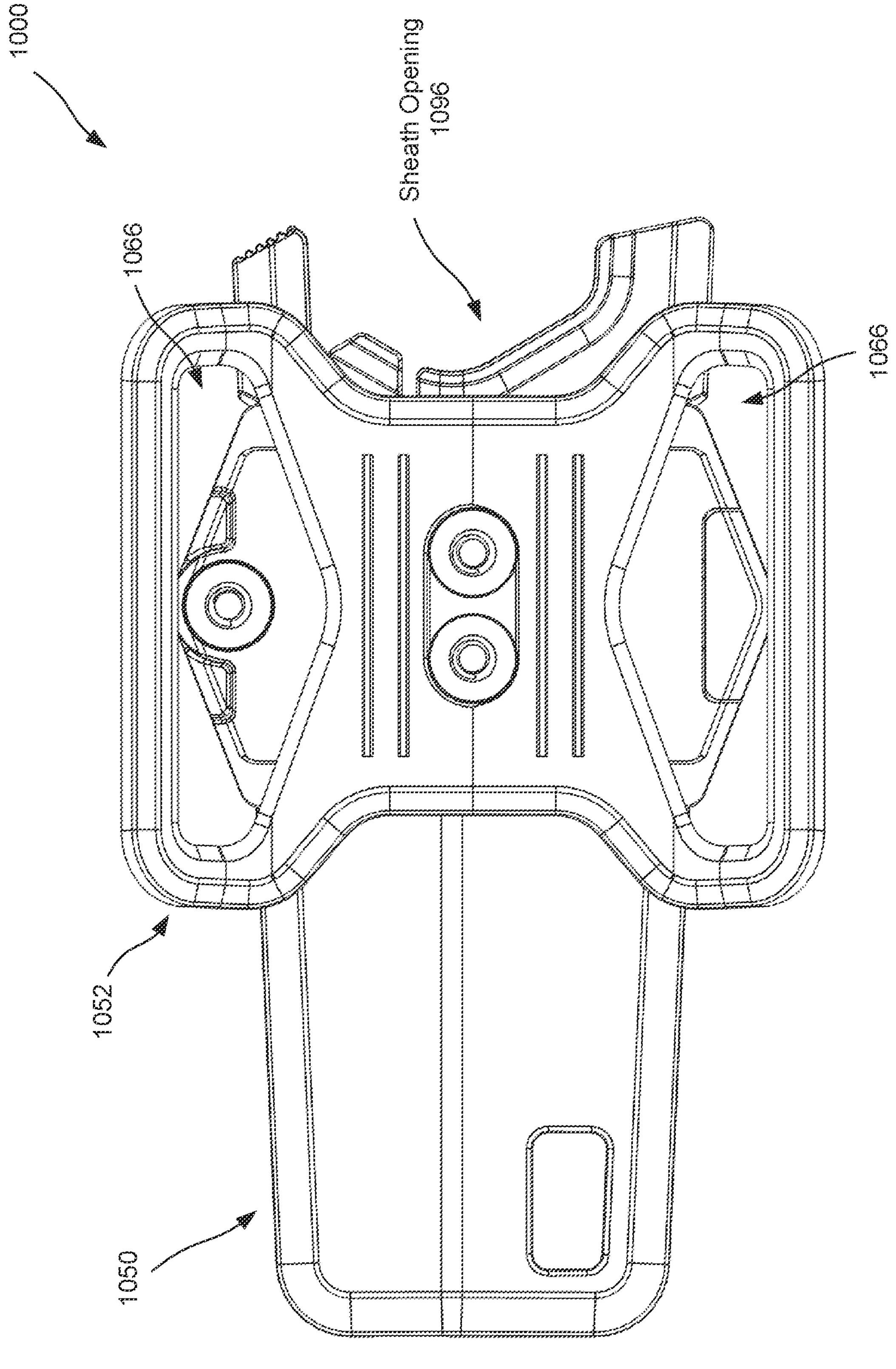
FIG. 10B shows an example of a sheath with a second rotatable clip, according to various aspects of the disclosure.
Figure 10C:
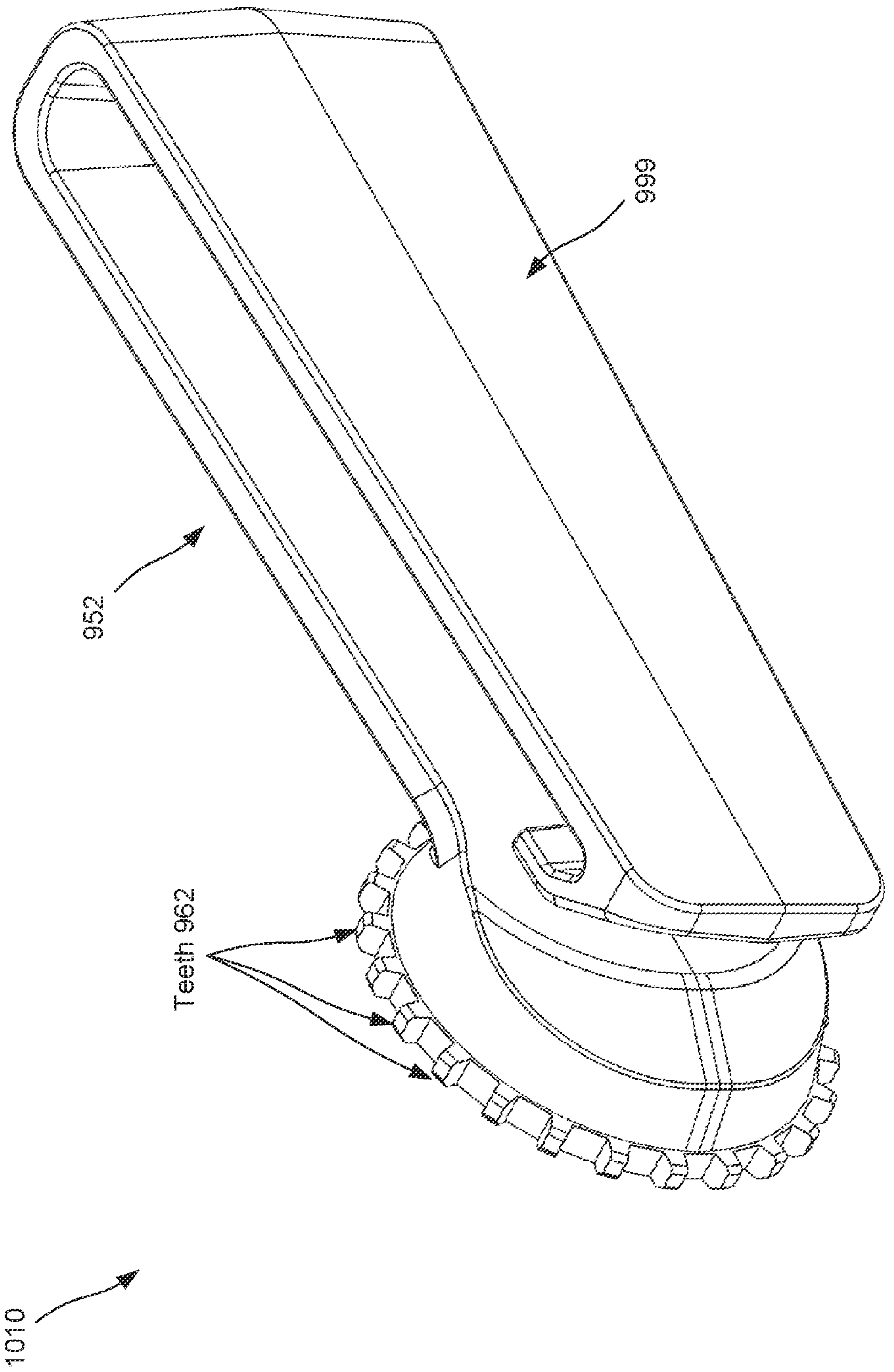
FIG. 10C shows a perspective view of the first rotatable clip of FIG. 10A, according to various aspects of the disclosure.

FIG. 10B shows one non-limiting example (1000) of an alternative clip 1052 configured for sling engagement, according to various aspects of the disclosure. In this example, the clip 1052 includes a sheath opening 1096 (i.e., opening that is shaped and sized to receive at least the blade of the knife), a sheath body 1050, and two elongated sling loop openings 1066 that are configured to receive a portion of one or more slings, a belt, etc. Furthermore, as seen in FIG. 10B, the clip 1052 resembles the shape of "butterfly wings", where each wing comprises one of the two elongated sling loop openings 1066. In some cases, a user can loop a sling, cord, or another applicable mechanism through both the sling loop openings 1066. Alternatively, only one of the two sling openings may be used to secure the sheath body 1050 to the user, while the other of the two sling openings can be used to secure another item (e.g., a tool, such as a blade sharpener) to the clip 1052. This example helps to illustrate that various types of clips, e.g., clips 152, 952, 1052, etc., can be implemented without undue experimentation.

FIG. 13 illustrates a cross section view of a knife assembly 1300, according to various aspects of the disclosure. Here, the knife assembly comprises a knife 1302 and a sheath 1304, where a blade or cutting-edge 1334 of the knife 1302 is inserted into the sheath 1304. As seen, the cross-sectional view of the knife 1300 assembly shows the cutting edge 1334 inserted into the sheath 1304, where the cutting-edge 1334 is secured within the sheath 1304 using a plurality of releasable locks. In this example, two releasable locks 1342, 1344 are used to secure the cutting-edge 1334 within the sheath 1304. It should be noted, however, that more than two releasable locks may be utilized in different embodiments. In other cases, a single releasable lock (e.g., one of releasable lock 1342 or 1344) may be utilized to secure the cutting-edge 1334 within the sheath 1304. In some embodiments, the knife 1302 can include one or more cutouts 1306 on a top edge thereof, and a first releasable lock 1342 (or first engagement feature 1342) can be implemented as a bushing on a flexible arm biased to engage one or more of the cutouts 1306 and thereby hold the knife 1302 within the sheath 1304 unless sufficient retraction force is applied to reverse bias the arm (i.e., push it upward) and allow the knife 1302 to be withdrawn from the sheath 1304. In some instances, the first engagement feature 1342 may be independently operable (e.g., regardless of whether the handle scales are attached or not). In some embodiments, the knife assembly (i.e., comprising the knife 1302 and the sheath 1304) may be designed such that the operation of the first engagement feature or releasable lock 1342 may be minimally affected by environmental factors.

Figure 17:
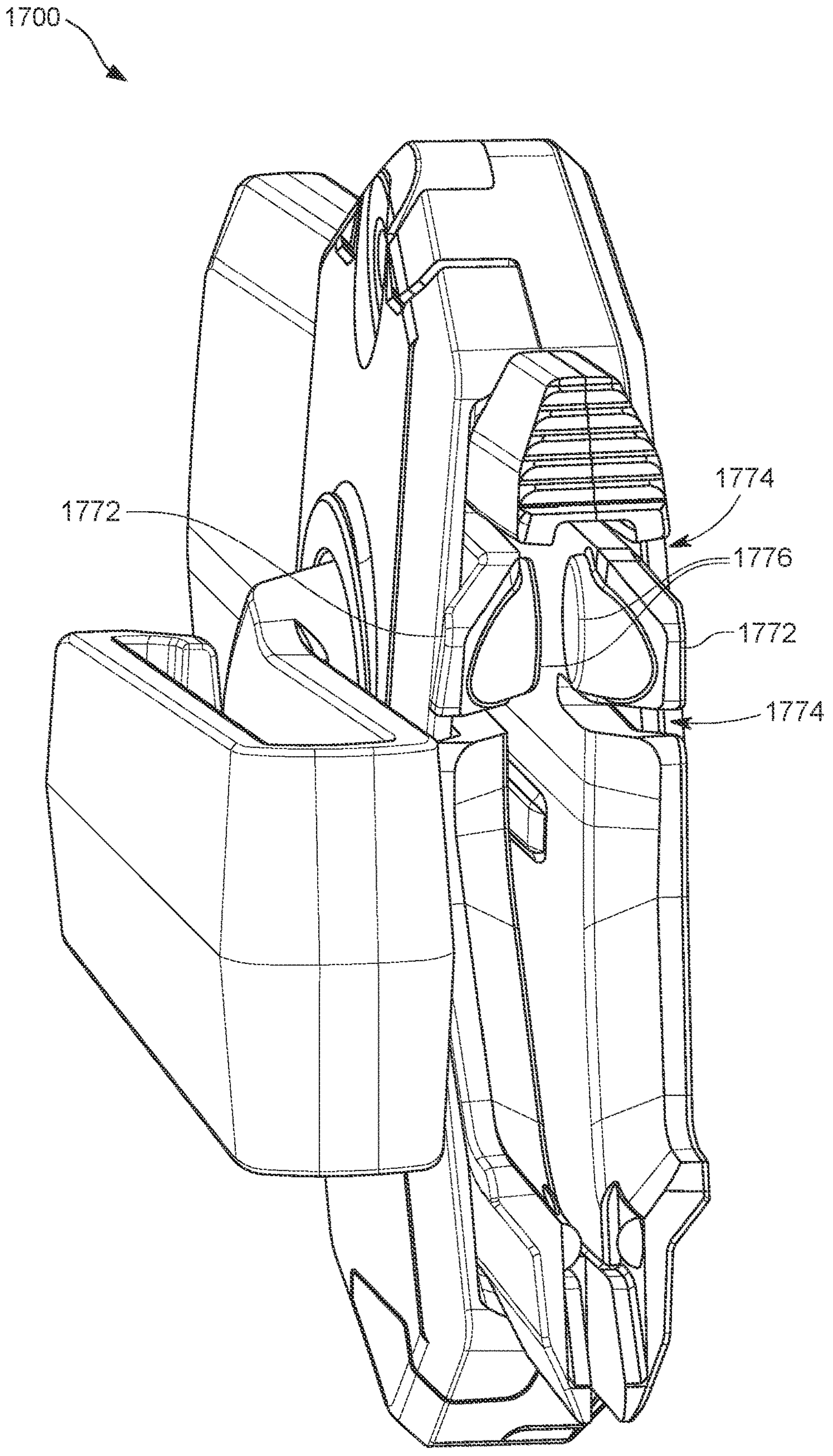
FIG. 17 illustrates a rear view of a knife sheath showing a plurality of engagement features for securing a knife within the knife sheath, according to various aspects of the disclosure.

In some embodiments, the knife assembly 1300 may also include a second engagement feature 1344, where the second engagement feature 1344 can comprise detents (e.g., spherical metal detents) on opposing inside faces of the sheath 1304 (best seen, e.g., in FIG. 17). For instance, the detents may be positioned at or near an open end of the sheath 1304, for instance, along the lower edge of the sheath 1304. Furthermore, these detents (e.g., spherical metal detents) may be shaped and sized to press against sides of the knife 1302, which can help guide the cutting edge 1334 of the knife 1302 into the sheath 1304 and/or complement the securing hold of the first engagement feature 1342. Additionally, or alternatively, the detents may also help provide a resistive force to complement the securing hold of the first engagement feature 1342 (e.g., the securing hold achieved as a result of the interaction between the first engagement feature 1342 and the one or more cutouts 1306 on the top edge of the knife). In combination with the first engagement feature 1342, sufficient resistive force can be applied by the second engagement feature 1344 (or the spherical detents) to prevent the knife 1302 from accidentally being removed from the sheath 1304.

It should be noted that the locations of the first and second engagement features 1342 and 1344, respectively, are not intended to be limiting and different locations are contemplated in different embodiments. In one non-limiting example, the location of the first engagement feature 1342 (e.g., releasable lock) along the top edge of the sheath 1304 and the second engagement feature 1344 (e.g., detents) along the bottom edge of the sheath 1304 may be switched. Additionally, or alternatively, the knife 1302 may include a plurality of cutouts (e.g., cutouts 1306) along both the top and bottom edge of knife 1302. In yet other cases, the knife 1302 may have cutouts 1306 along the bottom edge of the knife but not along the top edge. In some embodiments, the sheath 1304 may only include releasable locks (e.g., adjacent the top and bottom edges of the sheath) and no detents. Alternatively, the sheath 1304 may include detents and no releasable locks.

In some cases, a third engagement feature may be utilized, where the third engagement feature may be utilized in addition to (or in lieu) of the first and/or second engagement features, further described below in relation to FIGS. 17-18.

FIG. 17 shows an example of a sheath 1700 configured to receive at least a portion (e.g., cutting edge or blade) of a knife, according to various aspects of the disclosure. As seen, the sheath 1700 comprises an engagement feature 1772, where the engagement feature 1772 is configured to press laterally into a dimple (e.g., shown as dimple 370 in FIG. 3, dimple 1870 in FIG. 18) on either side of the blade (e.g., blade 1833 in FIG. 18). In some instances, this third engagement feature 1772 may be used in addition to, or in lieu of, the first and/or second engagement features 1342 and 1344 described above in relation to FIG. 13. In some examples, the third engagement feature 1772 may include a plurality of circular protrusions 1776. Furthermore, the sheath 1700 may include a plurality of slots 1774 (or recesses 1774) that enable the engagement feature 1772 to behave as a cantilevered arm that can pivot to and away from the blade, further described below in relation to FIG. 18.

Figure 18:
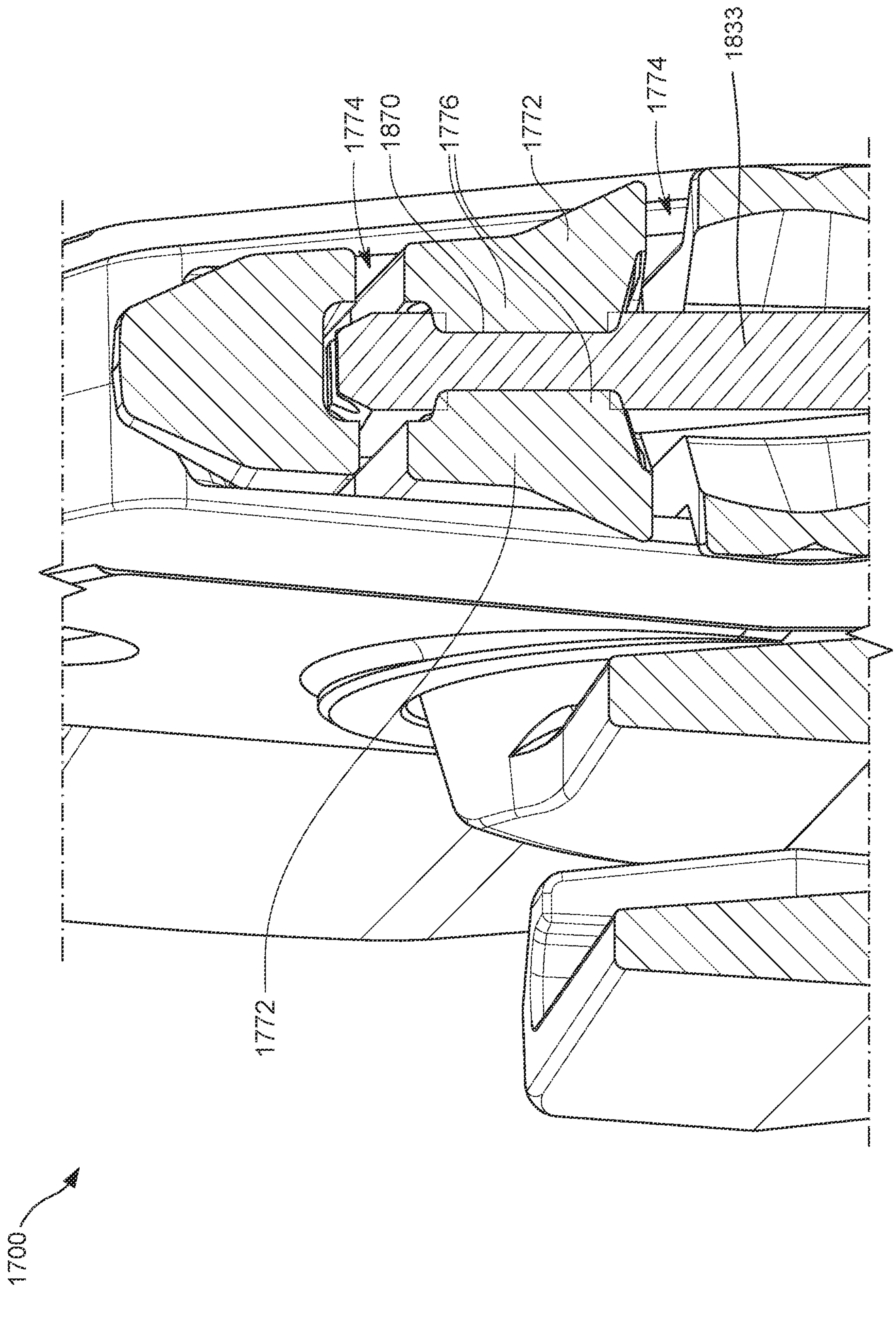
FIG. 18 illustrates a rear cross-sectional view of the knife sheath of FIG. 17 showing the interface between the knife and the engagement features of the sheath, according to various aspects of the disclosure.

FIG. 18 illustrates the sheath 1700 of FIG. 17, including the interaction between the engagement feature 1772 of the sheath 1700 and the dimples 1870 of the blade 1833, in accordance with one or more implementations. In some instances, the blade 1833 may include a plurality of dimples 1870 (also shown as dimples 370, 470, and 770 in the preceding figures) formed on either side of the blade. Furthermore, the engagement feature 1772 of the sheath 1700 may include a plurality of circular protrusions 1776, e.g., one circular protrusion on each of the inside surfaces, where the circular protrusions 1776 are arranged such that they are forced apart by the blade 1833 when the blade is inserted into the sheath 1700. In some instances, these circular protrusions 1776 are designed to snap back toward each other and into the dimples 1870 when the knife is sufficiently inserted into the sheath, which can help secure the knife within the sheath. In some instances, slots 1774 can be arranged above and below each of the third engagement features 1772. Such a design may allow the third engagement features 1772 to act like cantilevered arms that can more easily move towards and away from the blade 1833.

Figure 14:
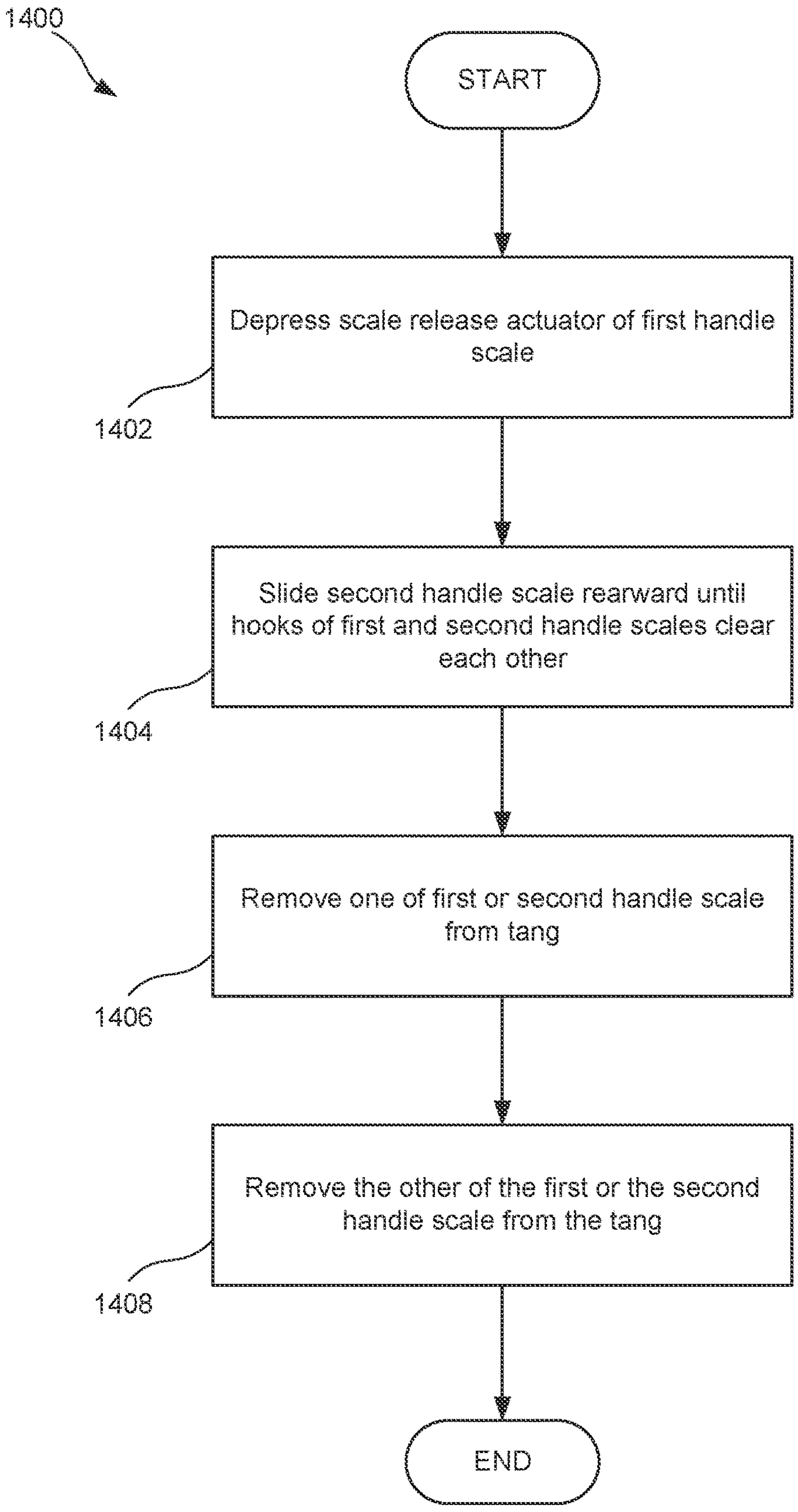
FIG. 14 illustrates a flowchart of a method of tool-less removal of handle scales from a knife, according to various aspects of the disclosure.

FIG. 14 illustrates an example of a method 1400 for tool-less removal of the handle scales from the tang of a knife, according to various aspects of the disclosure. As seen, the method 1400 can include depressing a scale release actuator (operation 1402) such as, but not limited to, the scale release actuator (e.g., scale release actuators 212, 312, 412) described in relation to FIGS. 2-6 and/or 8. At operation 1404, the method 1400 can further include sliding one of the two handle scales rearward (e.g., previously described in relation to FIGS. 7-8C) until hooks of the first and second handle scales clear each other (e.g., previously described in relation to FIG. 8A). Once the hooks have cleared each other, the handle scales can be removed (operation 1406 and operation 1408), for instance, as seen in FIGS. 8B and 8C. Although the handle scales can be removed one after the other, they can also be removed at the same or substantially the same time as each other. Furthermore, while a tower (e.g., tower 426 in FIG. 4) may require that the first handle scale be removed in a direction perpendicular to the tang, the second handle scale can be removed in a variety of directions perpendicular or oblique to the tang (e.g., at an angle of roughly 10°, or roughly 20°, or roughly 30° to name just three examples).

Figure 15:
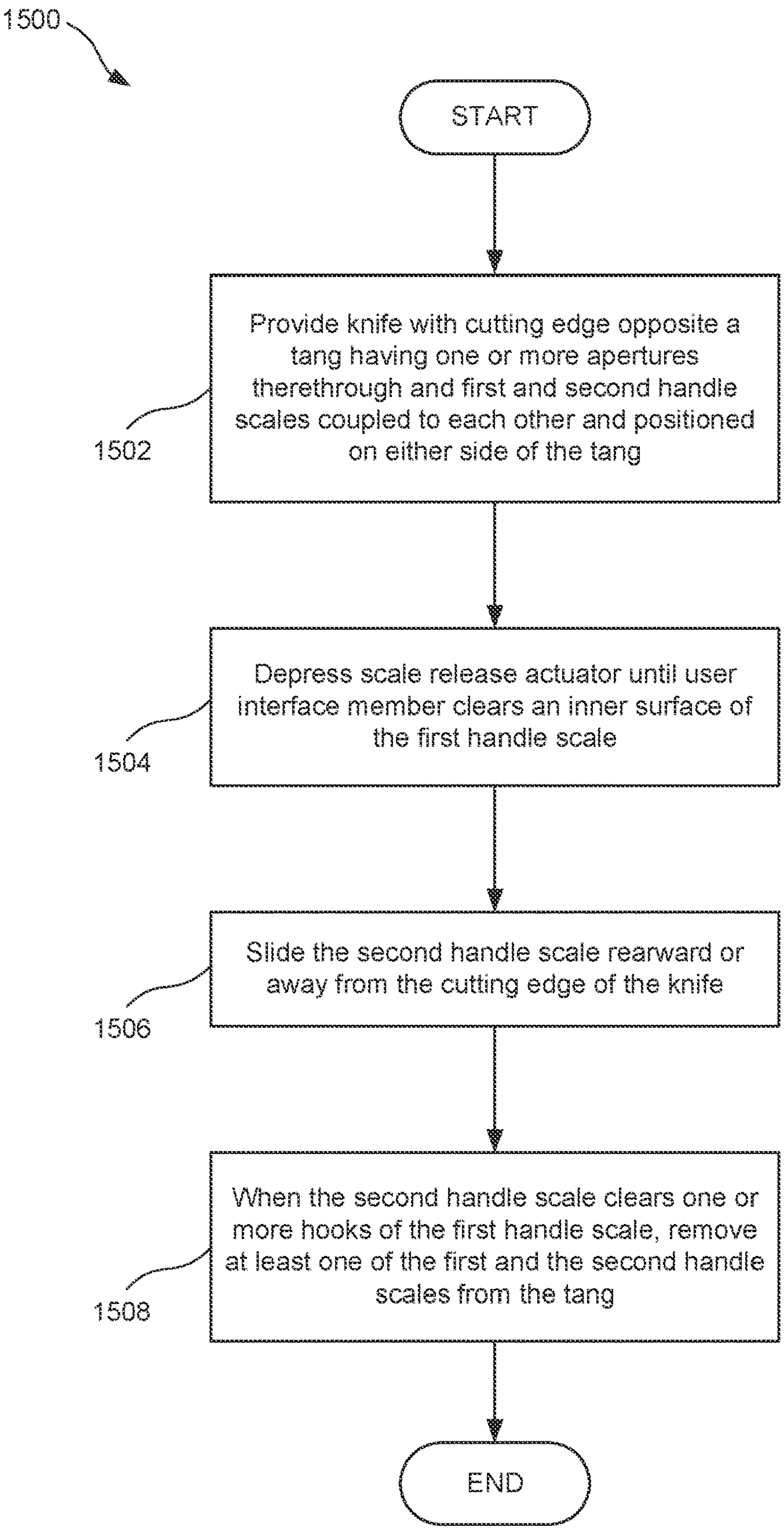
FIG. 15 illustrates another flowchart of a method of tool-less removal of handle scales from a knife, according to various aspects of the disclosure.

FIG. 15 illustrates another example of a method 1500 for removing the handle scales from the tang of a knife without the use of tools, according to various aspects of the disclosure. As seen, at operation 1502, the method 1500 can include providing a knife (e.g., knife 402 in FIG. 4) with a cutting edge (e.g., cutting edge 334) opposite a tang (e.g., tang 410), the tang having one or more apertures (e.g., apertures 416-*a*, 416-*b*, 416-*c*) therethrough. In some examples, the knife can also be provided with a first handle scale (e.g., first handle scale 406) and a second handle scale (e.g., second handle scale 408), where the handle scales are coupled to each other and positioned on either side of the tang (operation 1502). In other words, the tang may be "sandwiched" between the two handle scales.

In some embodiments, removing the handle scales comprises depressing a scale release actuator until a user interface member of the scale release actuator clears an inner surface of the first handle scale (operation 1504), and then sliding the second handle scale rearward (operation 1506) until at least the first and/or second handle scale can be removed in a direction perpendicular to a plane aligned with a flat orientation of the tang (operation 1508). In some cases, one of the first or the second handle scale can be removed first as they interlock via hooks (e.g., hooks 418, 420, 422, and/or 424 in FIG. 5) passing through one or more of the apertures in the tang, and once the second scale is sufficiently slid rearward or away from the cutting edge of the knife (operation 1506), the hooks no longer engage with each other, which allows either handle scale to then be removed from the tang (operation 1508).

Figure 16:
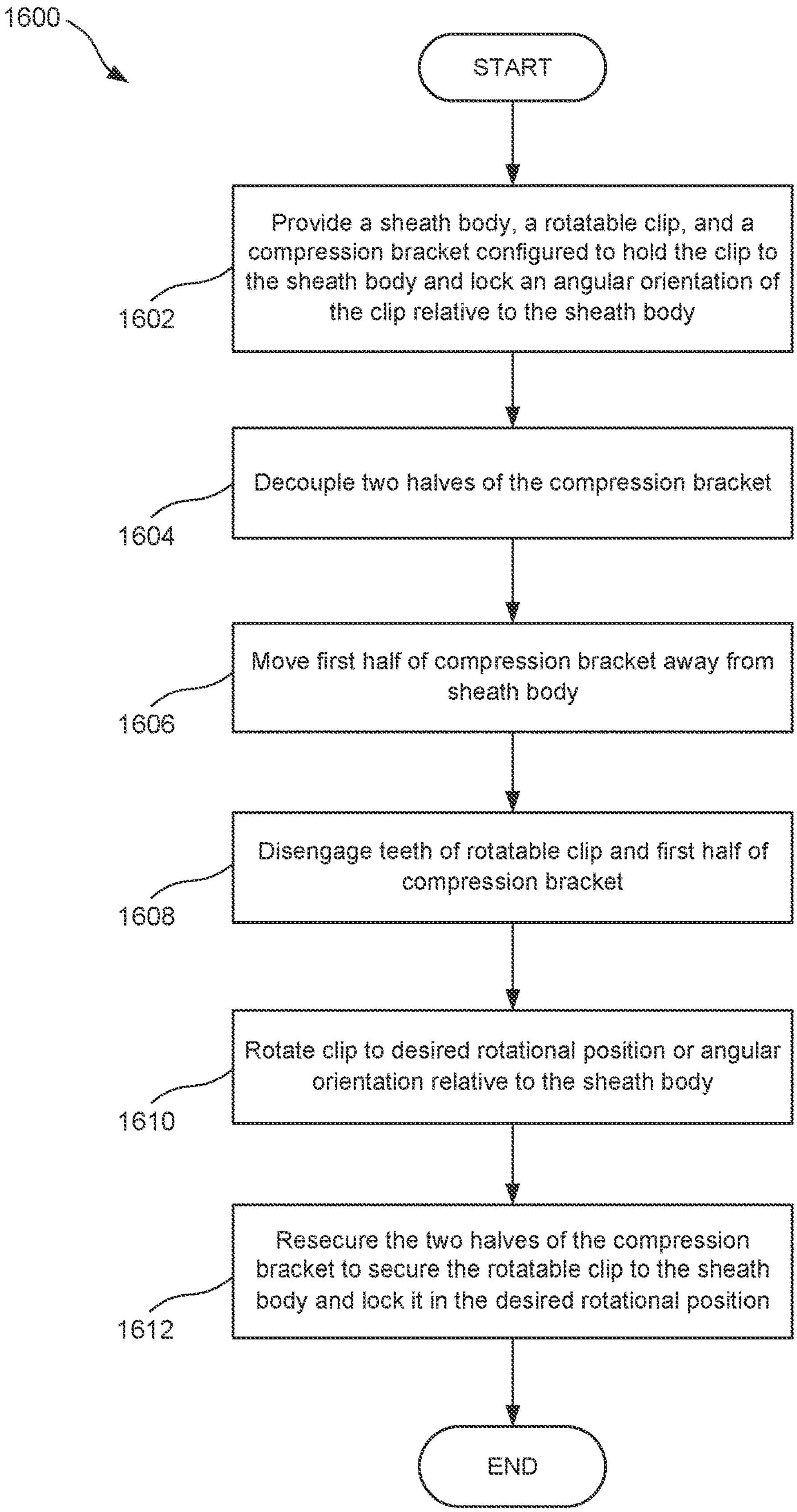
FIG. 16 illustrates a flowchart of a method of rotating a rotatable clip on a knife sheath, according to various aspects of the disclosure.

FIG. 16 illustrates a method 1600 of rotating the rotatable clip of a sheath to a desired rotational position or angular orientation, according to various aspects of the disclosure. The sheath may be similar or substantially similar to any of the sheaths described herein, including at least in relation to FIGS. 1, 9-13, and 17-18.

The method 1600 includes providing a sheath body, a rotatable clip removably coupled to the sheath body, and a compression bracket configured to hold the rotatable clip to the sheath body and lock an angular orientation of the rotatable clip relative to the sheath body (operation 1602). The method 1600 can further include decoupling two halves of the compression bracket (operation 1604) such that the first half of the compression bracket can be moved away from the sheath body (operation 1606) and the teeth of the rotatable clip and the first half of the compression bracket can be disengaged (operation 1608). In some cases, the rotatable clip can then be rotated to a desired rotational position relative to the sheath body (operation 1610), following which the two halves of the compression bracket can be resecured to each other (operation 1612), for instance, by sandwiching the rotatable clip between the first half of the compression bracket and the sheath body. This helps lock the rotatable clip into the selected/desired rotational position relative to the sheath body.

Figure 19:
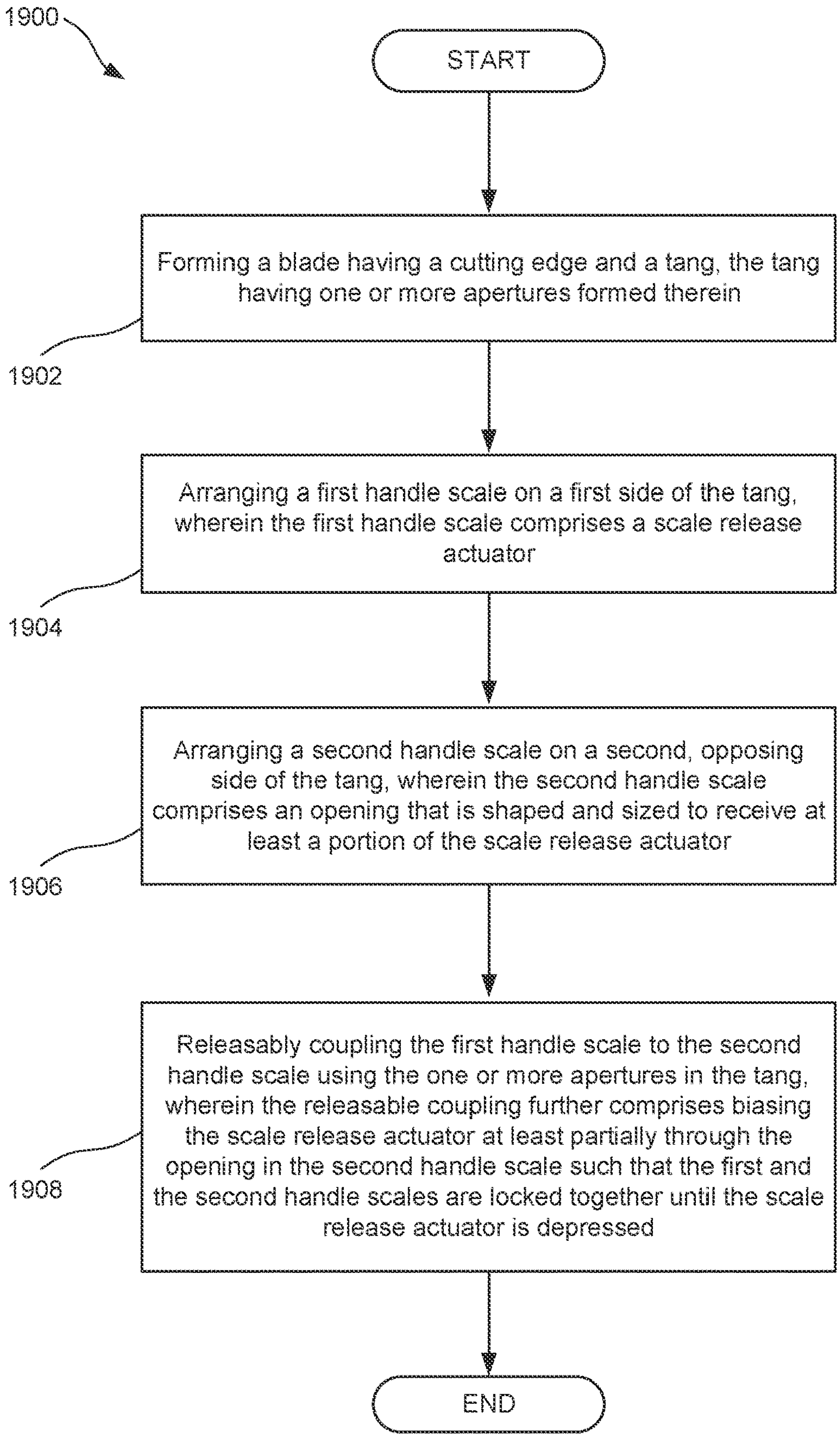
FIG. 19 illustrates a flowchart of a method for forming a knife assembly having removable handle scales, according to various aspects of the disclosure.

FIG. 19 illustrates an example of a method 1900 for forming a knife assembly, according to various aspects of the disclosure. The knife assembly may implement one or aspects of the knife assembly 100 described in relation to FIG. 1.

A first operation 1902 comprises forming a blade having a cutting edge and a tang, the tang having one or more apertures formed therein.

A second operation 1904 comprises arranging a first handle scale on a first side of the tang, the first handle scale comprising a scale release actuator.

A third operation 1906 comprises arranging a second handle scale on a second, opposing side of the tang, the second handle scale comprising an opening that is shaped and sized to receive at least a portion of the scale release actuator.

A fourth operation 1908 comprises releasably coupling the first handle scale to the second handle scale using the one or more apertures in the tang, wherein the releasable coupling further comprises biasing the scale release actuator at least partially through the opening in the second handle scale such that the first and the second handle scales are configured to be locked together until the scale release actuator is depressed.

Although this disclosure has generally discussed and shown a fixed blade knife, the removable handle scales and perforated tang could also be applied to a folding knife without undue experimentation.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A knife having removable handle scales, the knife comprising:

a blade having a cutting edge and a tang, the tang having one or more apertures formed therein;

a first handle scale removably coupled to a second handle scale of the knife, wherein the first and second handle scales are arranged on opposing sides of the tang and releasably coupled to each other through the one or more apertures in the tang, wherein the first handle scale comprises a scale release actuator that is biased at least partially through an opening in the second handle scale such that the first and the second handle scales are locked together until the scale release actuator is depressed, and wherein the first handle scale comprises a first hook that is shaped and sized to partially pass through at least a first of the one or more apertures in the tang, and wherein the second handle scale comprises a second hook that is shaped and sized to partially pass through at least the first of the one or more apertures in the tang.

2. The knife of claim 1, wherein the one or more apertures are rectangular in shape.

3. The knife of claim 2, wherein a shape and dimensions of at least one of the one or more apertures coincides with the M-LOK standard.

4. The knife of claim 2, wherein the one or more apertures comprise three apertures.

5. The knife of claim 1, wherein the first and second hooks are configured to engage with each other and hold the first and second handle scales together until the scale release actuator is depressed.

6. The knife of claim 5, wherein:

the second handle scale further comprises a third hook that is shaped and sized to partially pass through at least a second of the one or more apertures in the tang, the first handle scale comprises a fourth hook that is shaped and sized to partially pass through at least the second of the one or more apertures in the tang, the third and fourth hooks are configured to engage with each other and hold the first and second handle scales together until the scale release actuator is depressed, the first and second hooks are oriented toward a first end of the knife, and the third and fourth hooks are oriented toward a second, opposing end of the knife.

7. The knife of claim 1, wherein, when in a depressed position, the scale release actuator is configured to allow the second handle scale to be removed from the tang, and wherein removal of the second handle scale enables the first handle scale to be removed in a direction perpendicular to a face of the tang.

8. The knife of claim 7, wherein the first handle scale further comprises a tower that is shaped and sized to partially pass through one of the one or more apertures in the tang, and wherein the tower is positioned against an end of the one of the one or more apertures to allow at least one of:

removal of the first handle scale in a direction perpendicular to the face of the tang, based at least in part on the removal of the second handle scale from the tang; and prevent the first handle scale from sliding rearward in a direction parallel to a longitudinal axis through the knife.

9. The knife of claim 1, wherein the scale release actuator comprises a user interface member positioned atop a spring.

10. The knife of claim 9, wherein the spring comprises a flexible arm, wherein the flexible arm is arranged at an angle between the user interface member and the first handle scale, and wherein the flexible arm biases the user interface member such that at least a portion of the user interface member extends into the opening in the second handle scale.

11. The knife of claim 1, wherein the blade comprises one or more cutouts, wherein each of the one or more cutouts is positioned along one of an upper spine or a lower spine of the blade and configured to engage with a sheath.

12. The knife of claim 11, wherein the blade comprises a first dimple positioned on a first side of the blade and a second dimple positioned on a second, opposing side of the blade.

13. A method for forming a knife assembly comprising:

forming a blade having a cutting edge and a tang, the tang having a first aperture formed therein;

arranging a first handle scale on a first side of the tang, wherein the first handle scale comprises a scale release actuator;

arranging a second handle scale on a second, opposing side of the tang, wherein the second handle scale comprises an opening that is shaped and sized to receive at least a portion of the scale release actuator; and releasably coupling the first handle scale to the second handle scale using the first aperture in the tang, wherein the releasable coupling further comprises biasing the scale release actuator at least partially through the opening in the second handle scale such that the first and the second handle scales are locked together until the scale release actuator is depressed.

14. The method of claim 13, wherein a first portion of the first handle scale and a first portion of the second handle scale both pass through the first aperture in the tang to lock the first and second handle scales together.

15. The method of claim 14, wherein the tang has a second aperture formed therein configured to receive a second portion of the first handle scale and a second portion of the second handle scale to further lock the first and second handle scales together.

16. A knife assembly comprising:

a blade having a cutting edge and a tang, the tang having one or more apertures formed therein;

a first handle scale removably coupled to a second handle scale of the knife, wherein the first and second handle scales are arranged on opposing sides of the tang and releasably coupled to each other through the one or more apertures in the tang, wherein at least a portion of the blade is configured to be received within a knife sheath, the knife sheath comprising:

a sheath body; and one or more engagement features configured to interface with the blade to releasably hold at least the portion of the blade within the sheath body, wherein the blade comprises one or more cutouts, wherein each of the one or more cutouts is positioned along one of an upper spine or a lower spine of the blade, and wherein the one or more engagement features comprise one or more releasable locks, each of the one or more releasable locks configured to engage with one of the one or more cutouts of the blade to releasably hold at least the portion of the blade within the sheath body.

17. The knife assembly of claim 16, wherein the first handle scale comprises a scale release actuator that is biased at least partially through an opening in the second handle scale such that the first and the second handle scales are locked together until the scale release actuator is depressed.

18. The knife of assembly claim 16, wherein a shape and dimensions of at least one of the one or more apertures coincides with the M-LOK standard.

19. The knife of assembly claim 16, wherein the first handle scale comprises a first hook that is shaped and sized to partially pass through at least a first of the one or more apertures in the tang, and wherein the second handle scale comprises a second hook that is shaped and sized to partially pass through at least the first of the one or more apertures in the tang, and wherein the first and second hooks are configured to engage with each other and hold the first and second handle scales together until the scale release actuator is depressed.

20. The knife assembly of claim 16, wherein, when in a depressed position, the scale release actuator is configured to allow the second handle scale to be removed from the tang, and wherein removal of the second handle scale enables the first handle scale to be removed in a direction perpendicular to a face of the tang.

21. The knife assembly of claim 16, wherein the blade comprises a first dimple positioned on a first side of the blade and a second dimple positioned on a second, opposing side of the blade.

* * * * *